United States Patent
Hill et al.

(10) Patent No.: US 9,518,496 B2
(45) Date of Patent: Dec. 13, 2016

(54) EXHAUST GAS FLOW DISTRIBUTION SYSTEM

(71) Applicant: Tenneco Automotive Operating Company Inc., Lake Forest, IL (US)

(72) Inventors: Edward C. Hill, Jackson, MI (US); Hyde Kani, Jackson, MI (US); John Hardin, Milford, MI (US); Manoj K. Sampath, Ann Arbor, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 543 days.

(21) Appl. No.: 14/028,645

(22) Filed: Sep. 17, 2013

(65) Prior Publication Data

US 2014/0079599 A1    Mar. 20, 2014

Related U.S. Application Data

(60) Provisional application No. 61/702,507, filed on Sep. 18, 2012.

(51) Int. Cl.
*F01N 3/28* (2006.01)
*B01F 5/04* (2006.01)
(Continued)

(52) U.S. Cl.
CPC ......... *F01N 3/2892* (2013.01); *B01F 3/04049* (2013.01); *B01F 5/0451* (2013.01);
(Continued)

(58) Field of Classification Search
USPC .................................................. 422/176, 182
See application file for complete search history.

(56) References Cited

U.S. PATENT DOCUMENTS 5,593,645 A * 1/1997 Steenackers ............. B01J 35/04
   422/176
6,712,869 B2   3/2004 Cheng et al.
(Continued)

FOREIGN PATENT DOCUMENTS

DE         4203807      8/1993
DE   10 2007 052 262   5/2009
(Continued)

*Primary Examiner* — Tom P. Duong
*Assistant Examiner* — Jelitza Perez
(74) *Attorney, Agent, or Firm* — Harness, Dickey & Pierce, P.L.C.

(57) ABSTRACT

An exhaust after-treatment system for treating an exhaust produced by an engine, including an exhaust passage in communication with the engine; an injector for dosing an exhaust treatment fluid into the exhaust passage, a mixing device positioned downstream from the injector, the mixing device operable to intermingle the exhaust treatment fluid and the exhaust; an irregularly-shaped exhaust treatment substrate positioned downstream from the mixing device; and a dispersion device positioned between the mixing device and the irregularly-shaped exhaust treatment substrate. The dispersion device includes a plurality of dispersion members each being operable to direct an exhaust stream flowing through the dispersion device into a plurality of different directions to disperse the exhaust flow over substantially an entire surface of the irregularly-shaped exhaust treatment substrate.

22 Claims, 18 Drawing Sheets

(51) Int. Cl.
  *B01F 5/06* (2006.01)
  *B01F 3/04* (2006.01)
  *F01N 3/20* (2006.01)
  *F01N 3/035* (2006.01)
  *F01N 13/00* (2010.01)

(52) U.S. Cl.
  CPC .......... *B01F 5/0616* (2013.01); *B01F 5/0689* (2013.01); *F01N 3/035* (2013.01); *F01N 3/2066* (2013.01); *F01N 13/009* (2014.06); *B01F 2005/0639* (2013.01); *Y02T 10/24* (2013.01)

(56) References Cited

U.S. PATENT DOCUMENTS

| | | | |
|---|---|---|---|
| 6,722,123 B2 | 4/2004 | Liu et al. | |
| 7,581,387 B2 | 9/2009 | Bui et al. | |
| 7,814,745 B2 * | 10/2010 | Levin | B01F 3/04049 60/273 |
| 7,971,579 B2 | 7/2011 | Heald et al. | |
| 8,297,050 B2 | 10/2012 | Ranganathan et al. | |
| 2002/0073698 A1 | 6/2002 | D'Herde et al. | |
| 2009/0000287 A1 | 1/2009 | Blaisdell et al. | |
| 2011/0258983 A1 | 10/2011 | Vosz | |
| 2012/0151902 A1 | 6/2012 | Yi et al. | |

FOREIGN PATENT DOCUMENTS

| | | |
|---|---|---|
| EP | 1514591 | 3/2005 |
| KR | 10-2000-0034101 | 6/2000 |
| WO | WO97/35107 | 9/1997 |

* cited by examiner

EXHAUST GAS FLOW DISTRIBUTION SYSTEM

CROSS-REFERENCE TO RELATED APPLICATIONS

This application claims the benefit of U.S. Provisional Application No. 61/702,507, filed on Sep. 18, 2012. The entire disclosure of the above application is incorporated herein by reference.

FIELD

The present disclosure relates to an exhaust gas flow distribution system.

BACKGROUND

This section provides background information related to the present disclosure which is not necessarily prior art.

Emission regulation requirements are mandating that engines have exhaust after-treatment systems to eliminate, or at least substantially minimize, the emission of, for example, particulate matter and $NO_X$. To eliminate or reduce the emission of particulate matter and $NO_X$, exhaust after-treatment systems can include exhaust treatment components such as a particulate filter (e.g., a diesel particulate filter (DPF)), a selective catalyst reduction (SCR) component, and a diesel oxidation catalyst (DOC) component.

SCR and DOC components generally work in conjunction with reductant injection systems that inject a reductant into the exhaust stream to treat the exhaust before the exhaust enters the SCR or DOC components. In the case of SCR, a reductant solution including urea is injected into the exhaust stream before entry into the SCR component. In the case of DOC, a hydrocarbon reductant such as diesel fuel is injected into the exhaust stream before entry into the DOC component.

Due to packing constraints, exhaust treatment components such as the SCR component or DOC component can be irregularly shaped. Due to the irregular shape of the exhaust treatment component, it can be difficult to ensure a uniform dispersion of the reductant exhaust mixture over the entire surface of the catalyst-coated substrates of the irregularly-shaped exhaust treatment component.

SUMMARY

This section provides a general summary of the disclosure, and is not a comprehensive disclosure of its full scope or all of its features.

The present disclosure provides an exhaust after-treatment system including an exhaust passage, an irregularly-shaped exhaust treatment component in communication with the exhaust passage, and a dispersion device disposed in the exhaust passage at a position upstream of the exhaust treatment device. The dispersion device includes a plurality of dispersion members each being operable to direct an exhaust stream flowing through the dispersion device into a plurality of different directions to disperse the exhaust flow over substantially an entire surface of the irregularly-shaped exhaust treatment component.

The present disclosure also provides an exhaust after-treatment system for treating an exhaust produced by an engine, including an exhaust passage in communication with the engine; an injector for dosing an exhaust treatment fluid into the exhaust passage, a mixing device positioned downstream from the injector, the mixing device operable to intermingle the exhaust treatment fluid and the exhaust; an irregularly-shaped exhaust treatment substrate positioned downstream from the mixing device; and a dispersion device positioned between the mixing device and the irregularly-shaped exhaust treatment substrate. The dispersion device includes a plurality of dispersion members each being operable to direct an exhaust stream flowing through the dispersion device into a plurality of different directions to disperse the exhaust flow over substantially an entire surface of the irregularly-shaped exhaust treatment substrate.

Lastly, the present disclosure provides an exhaust after-treatment system for treating an exhaust produced by an engine, including an exhaust passage in communication with the engine; an injector for dosing an exhaust treatment fluid into the exhaust passage; a mixing device positioned downstream from the injector, the mixing device operable to intermingle the exhaust treatment fluid and the exhaust; an irregularly-shaped exhaust treatment substrate positioned downstream from the mixing device, the irregularly-shaped exhaust treatment substrate including at least a first lobe, a second lobe, and a third lobe; and a cone-shaped dispersion device positioned between the mixing device and the irregularly-shaped exhaust treatment substrate. The dispersion device includes a plurality of perforations for directing an exhaust stream flowing through the dispersion device into a plurality of different directions to disperse the exhaust flow over substantially an entire surface of the irregularly-shaped exhaust treatment substrate. The plurality of perforations include first perforations that directly influence a portion of the exhaust to flow toward the first lobe, second perforations that directly influence a portion of the exhaust to flow toward the second lobe, and third perforations that directly influence a portion of the exhaust to flow toward the third lobe.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
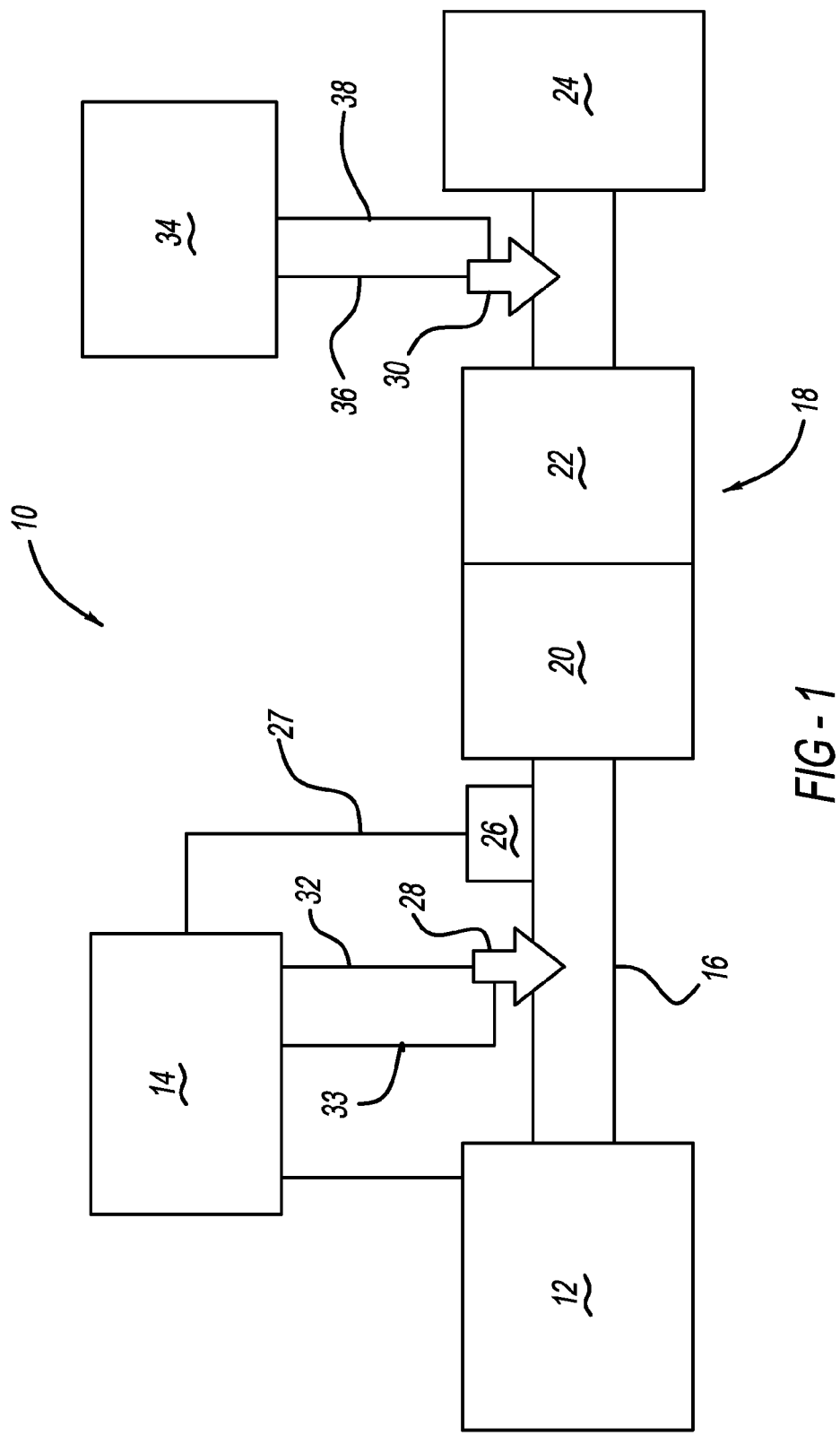
FIG. 1 is a schematic representation of an exhaust after-treatment in accordance with a principle of the present disclosure.

FIG. 1 schematically illustrates an exhaust system 10 according to the present disclosure. Exhaust system 10 includes at least an engine 12 in communication with a fuel source 14 that, once consumed, will produce exhaust gases that are discharged into an exhaust passage 16 having an exhaust after-treatment system 18. Downstream from engine 12 can be disposed a DOC component 20, a DPF component 22, and a SCR component 24. Although not required by the present disclosure, exhaust after-treatment system 18 can further include components such as a burner 26 to increase a temperature of the exhaust gases passing through exhaust passage 16. Increasing the temperature of the exhaust gas is favorable to achieve light-off of the catalyst in DOC and SCR components 20 and 24 in cold-weather conditions and upon start-up of engine 12, as well as initiate regeneration of DPF 22 when required. To provide fuel to burner 26, the burner can include an inlet line 27 in communication with fuel source 14.

To assist in reduction of the emissions produced by engine 12, exhaust after-treatment system 18 can include injectors 28 and 30 for periodically injecting exhaust treatment fluids into the exhaust stream. As illustrated in FIG. 1, injector 28 can be located upstream of DOC 20 and is operable to inject a hydrocarbon exhaust treatment fluid that assists in at least reducing $NO_X$ in the exhaust stream, as well as raising exhaust temperatures for regeneration of DPF 22. In this regard, injector 28 is in fluid communication with fuel source 14 by way of inlet line 32 to inject a hydrocarbon such as diesel fuel into the exhaust passage 16 upstream of DOC 20. Injector 28 can also be in communication with fuel source 14 via return line 33. Return line 33 allows for any hydrocarbon not injected into the exhaust stream to be returned to fuel source 14. Flow of hydrocarbon through inlet line 32, injector 28, and return line 33 also assists in cooling injector 28 so that injector 28 does not overheat. Although not illustrated in the drawings, injectors 28 can be configured to include a cooling jacket that passes a coolant around injectors 28 to cool them.

Injector 30 can be used to inject an exhaust treatment fluid such as urea into exhaust passage 16 at a location upstream of SCR 24. Injector 30 is in communication with a reductant tank 34 via inlet line 36. Injector 30 also is in communication with tank 34 via return line 38. Return line 38 allows for any urea not injected into the exhaust stream to be returned to tank 34. Similar to injector 28, flow of urea through inlet line 36, injector 30, and return line 38 also assists in cooling injector 30 so that injector 30 does not overheat. It should be appreciated that reductants other than those listed may be used to reduce the $No_x$ content of the exhaust. A different relative positioning of exhaust treatment devices is also within the scope of the present disclosure.

FIGS. 2-5 illustrate a section 40 of exhaust passage 16. Section 40 can include a plurality of pipes and/or fittings 42, 44, and 46 coupled together to define section 40. An inlet section 42 may be located immediately downstream from engine 12, where an injector housing 48 is disposed. To mount injector 28 or 30 injector housing 48, injector housing 48 may include an aperture 50 for receipt of injector 28 or 30. Housing 48 can be angled relative to inlet section 42 to properly ensure a uniform dispersion of droplets ejected by injector 30 into the exhaust stream. It should be understood that although the following description will generally be directed to the injection of a urea exhaust treatment fluid from injector 30, and to the use of an SCR exhaust treatment component 24, the present disclosure should not be limited thereto. Specifically, it should be appreciated that the exhaust treatment fluid can be a hydrocarbon exhaust treatment fluid, and that the exhaust treatment component can be a catalyst-coated DPF 20 or a DOC 22, without departing from the scope of the present disclosure.

Downstream from injector housing 48 in inlet section 42 can be disposed a mixer device 52. Mixer device 52 is for creating a turbulent flow of the exhaust through inlet section 42. In this regard, mixer device 52 can include a plurality of plates 54 having differently oriented tabs 56. Each plate 54 can mounted to a ring-shaped flange 58 that may be welded to an inner surface 60 of inlet section 42. Tabs 56 deflect the exhaust flow as it passes through mixer device 52 in different directions to create the turbulent flow. By creating a turbulent flow of the exhaust stream, the exhaust treatment fluid ejected into the exhaust stream by injector 30 can be uniformly dispersed into the exhaust stream. Injector 30 may be oriented such that the droplets ejected from injector 30 are directed towards mixer device 52 to impinge upon a portion of the mixer device. Alternatively, the droplets may be ejected into the exhaust at a position upstream from mixer device 52.

Figure 3:
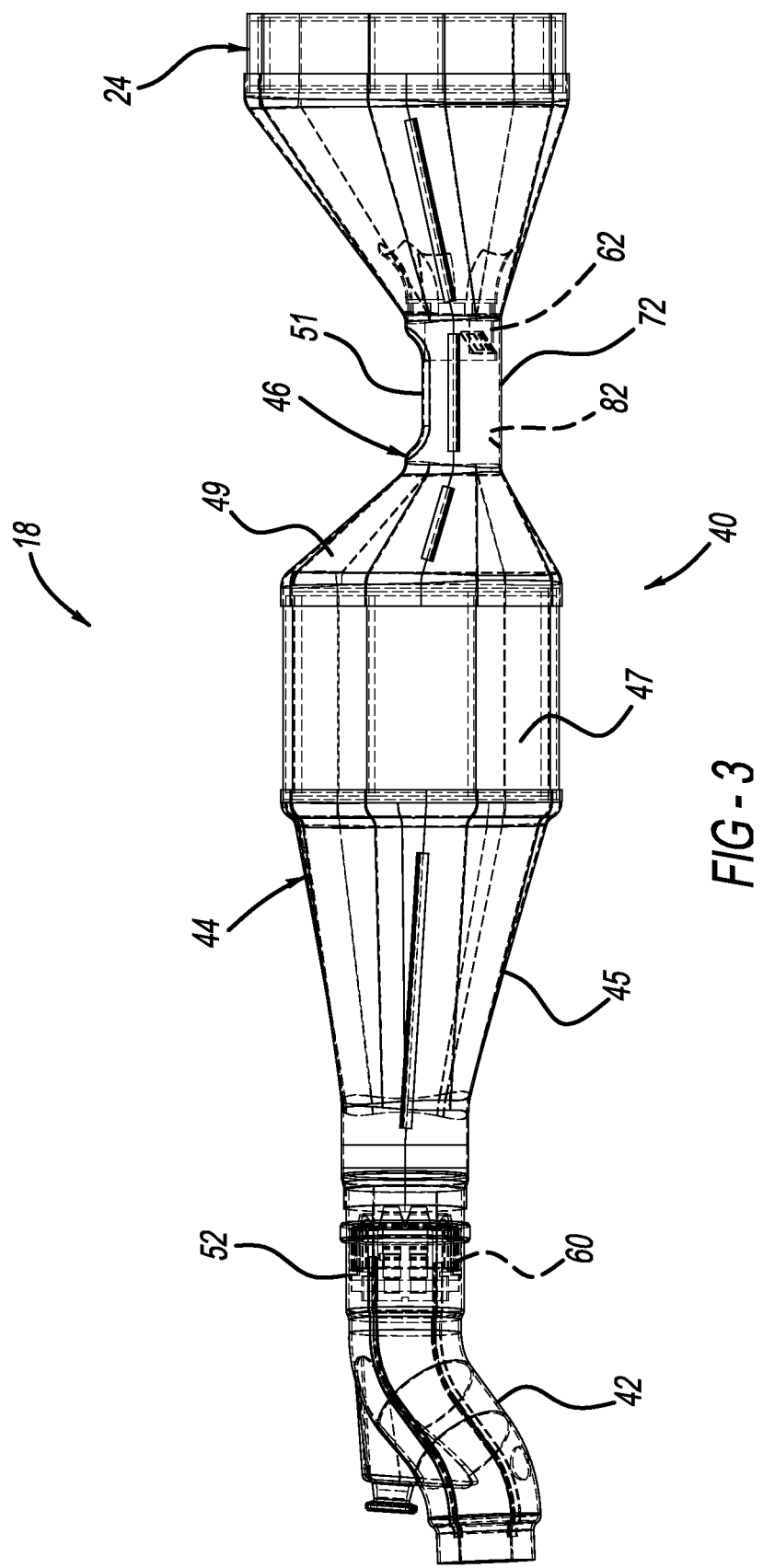
FIG. 3 is a side-perspective view showing the section of the exhaust line illustrated in FIG. 2.
Figure 4:
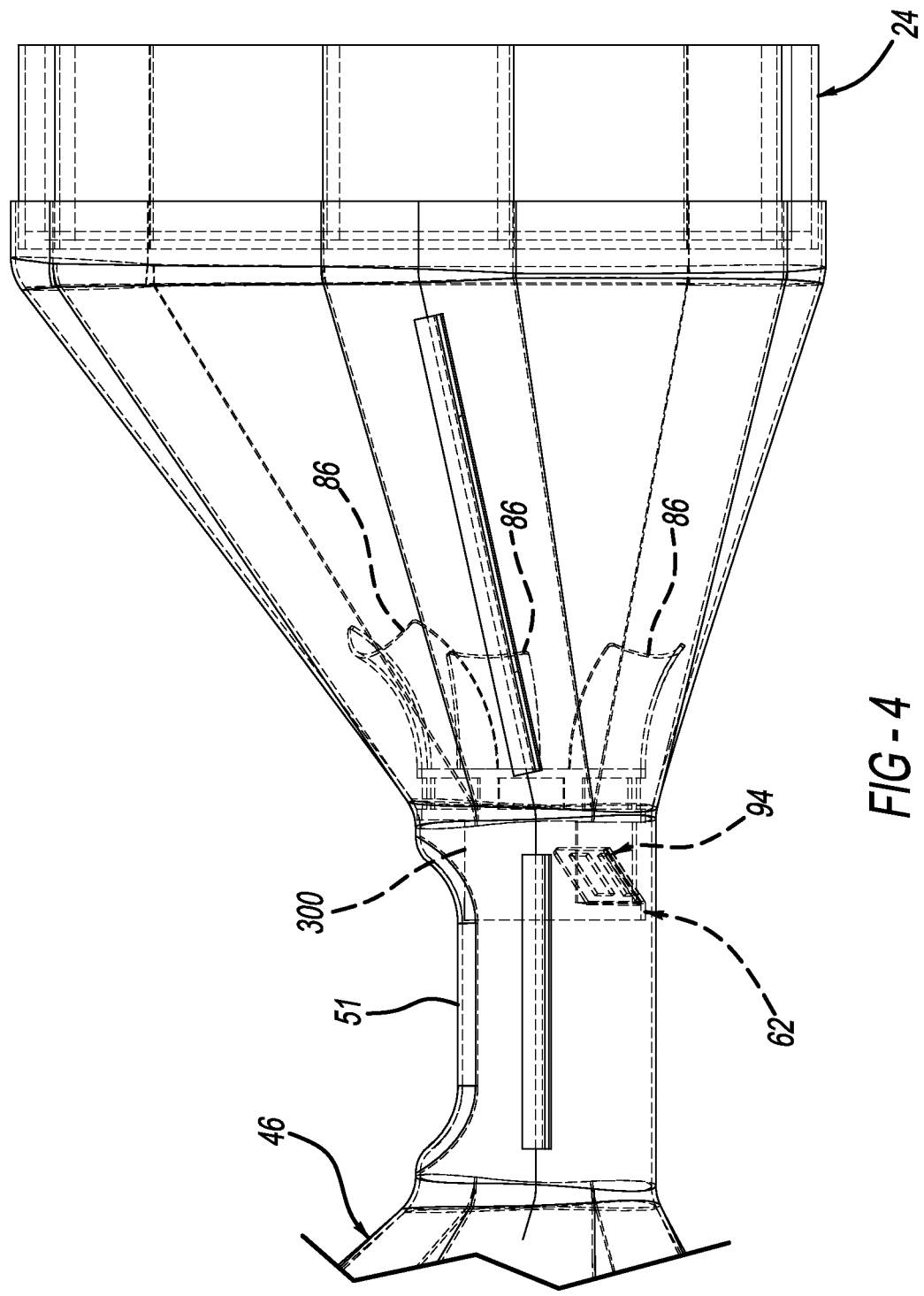
FIG. 4 is a side-perspective view of a dispersion device disposed in the section of exhaust line.

After the exhaust stream passes through mixer device 52, the mixture of exhaust and exhaust treatment fluid passes through an intermediate section 44 of section 40. Intermediate section 44 is not required for the present disclosure, but may be desirable from the standpoint that the exhaust treatment fluid and exhaust stream is allowed to further intermix and react therein. As best illustrated in FIG. 3, intermediate section 44 includes a radially expanding first section 45, a housing 47 for supporting a DOC 20 or DPF 22, and a radially narrowing second section 49. After passing through intermediate section 44, the exhaust stream enters an outlet section 46 of section 40.

Figure 2:
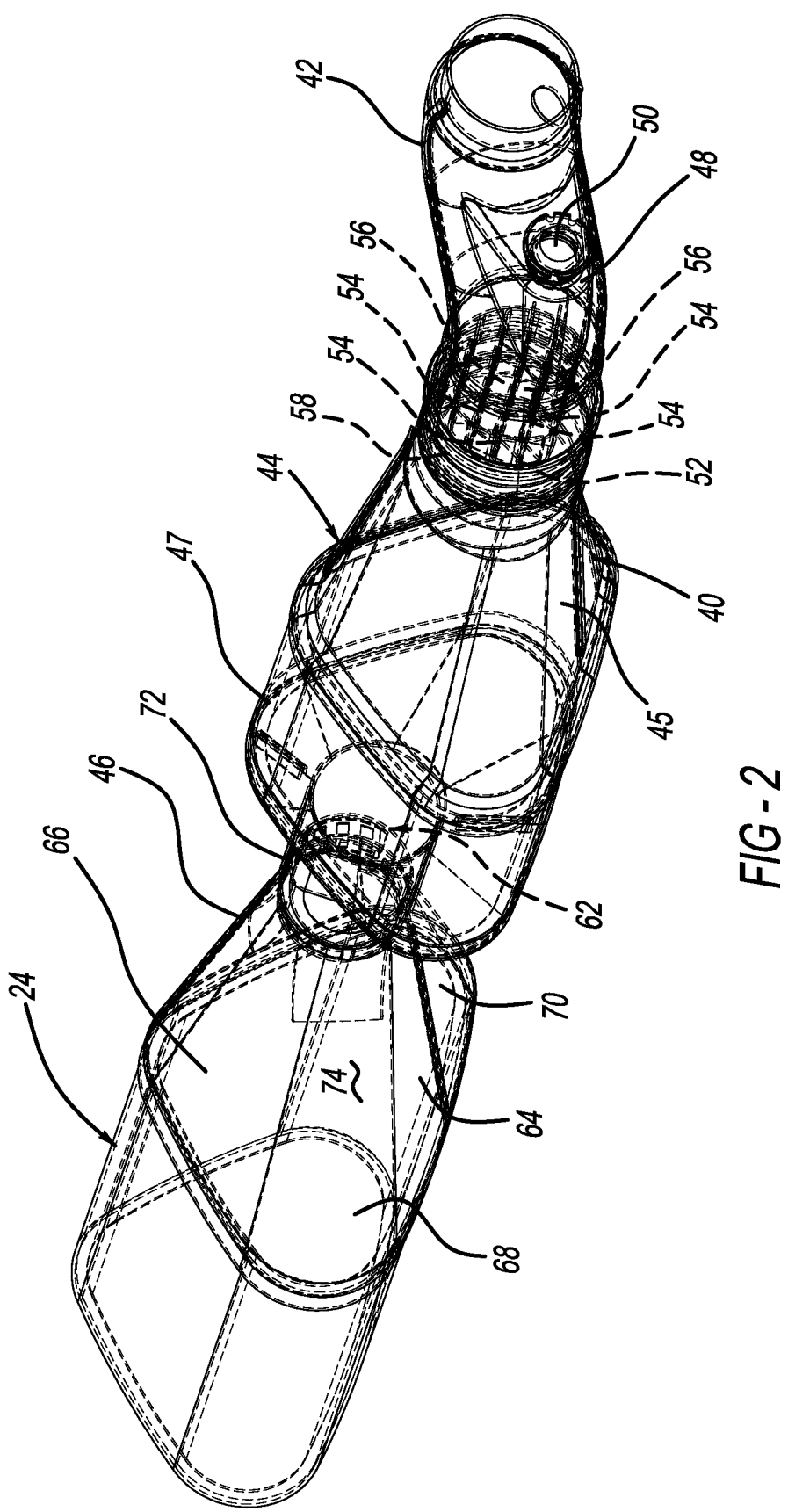
FIG. 2 is a perspective view showing a section of an exhaust line in accordance with a principle of the present disclosure.
Figure 5:
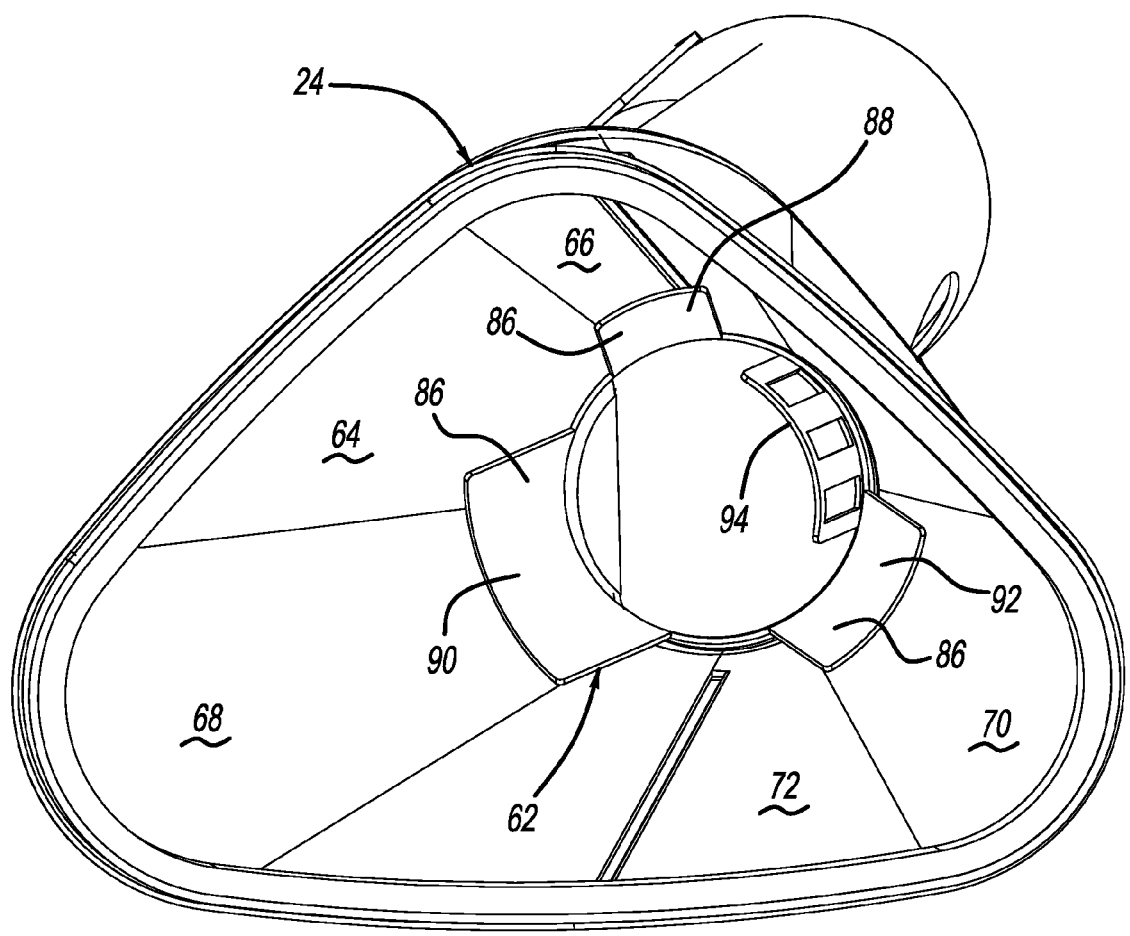
FIG. 5 is an axial-perspective view of the dispersion device disposed in the section of exhaust line.
Figure 6:
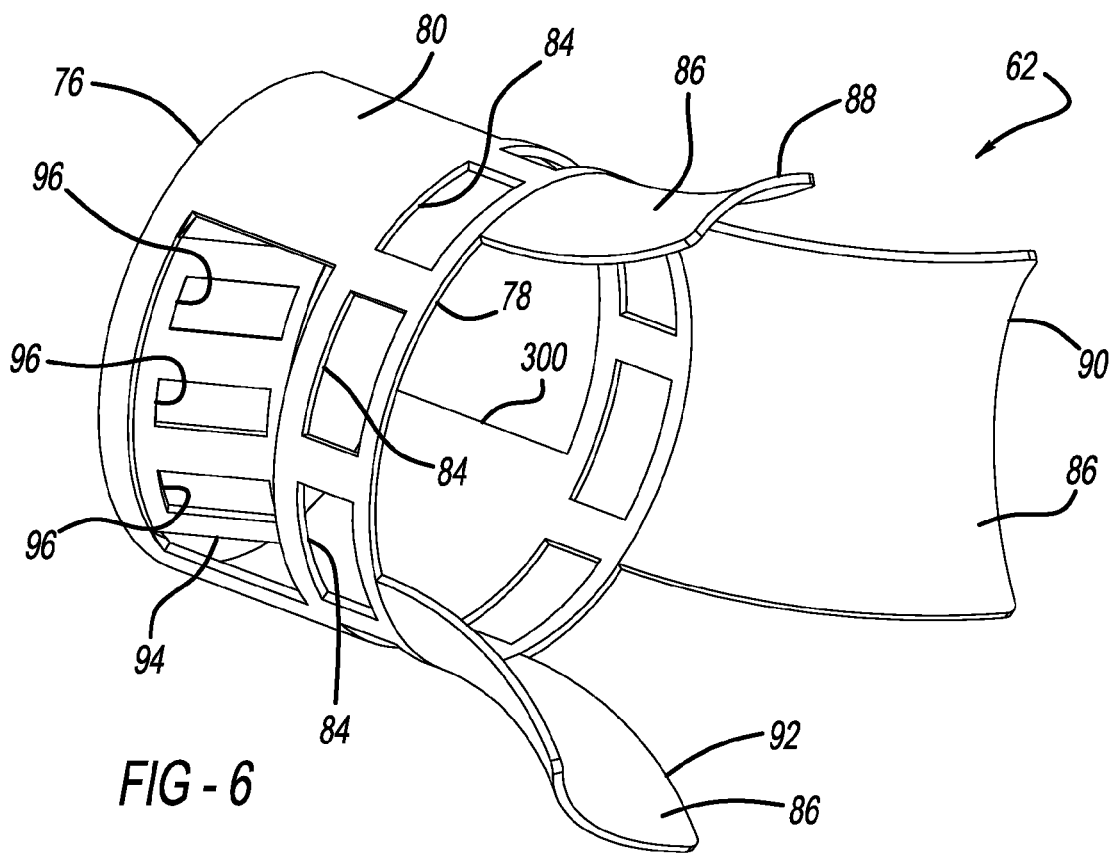
FIG. 6 is a perspective view of the dispersion device illustrated in FIGS. 4 and 5.
Figure 7:
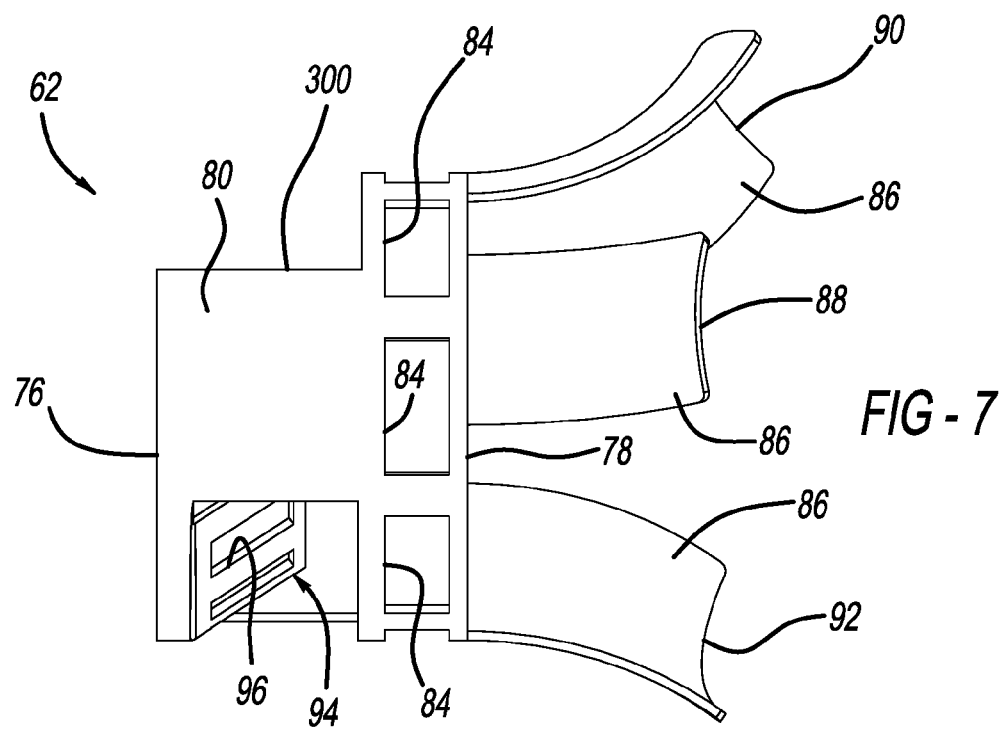
FIG. 7 is a side-perspective view of the dispersion device illustrated in FIG. 6.

In accordance with the present disclosure, a dispersion device 62 can be disposed in outlet section 46. Outlet section 46 can be disposed immediately upstream of an exhaust treatment component such as SCR 24. As will be described in more detail below, the exhaust treatment component 24 can be irregularly shaped to account for packaging constraints when installing exhaust after-treatment system 18 on a vehicle, marine engine, or stationary engine application that requires exhaust after-treatment. As best illustrated in FIG. 5, SCR 24 includes a substrate 64 that is substantially triangular in shape. That is, substrate 64 includes three lobes 66, 68, and 70. Further, as best shown in FIG. 2, a pipe 72 of outlet section 46 is off-set from a center 74 of substrate 64. Pipe 72 may be off-set from center 74 due to the packing restraints required to install exhaust after-treatment system 18.

Because pipe 72 is off-set from center 74 of substrate 64 and because substrate 64 is irregularly-shaped (i.e., triangular), a uniform flow of the exhaust stream may not impinge over the entire surface of substrate 64. The entire surface of substrate 64, therefore, is not utilized in treating the exhaust stream to reduce the environmentally harmful components of the exhaust gas. Dispersion device 62 assists in dispersing the mixture of exhaust treatment fluid and exhaust over the entire surface of substrate 64.

As best shown in FIGS. 6-9E, dispersion device 62 includes a first end 76 and a second end 78. Exhaust gases will pass through dispersion device 62 from first end 76 to second end 78. At first end 76 is formed a cylindrical ring 80 that may be welded to an interior surface 82 of outlet section 46 to secure dispersion device 62 to outlet section 46. Disposed about a circumference of cylindrical ring 80 may be a plurality of cut-outs 84. Cut-outs 84 allow a portion of the exhaust gases that enter dispersion device 62 at first end 76 to disperse radially outward relative to cylindrical ring 80. By allowing a portion of the exhaust gases to escape dispersion device 62 through cut-outs 84, backpressure in exhaust system 10 is reduced.

The remaining portion of the exhaust gases that do not exit the dispersion device 62 through cut-outs 84 exit dispersion device 62 at second end 78. At second end 78 can be formed a plurality of deflection members 86. Deflection members 86 are formed to smoothly flare radially outward relative to cylindrical ring 80.

As noted above, irregularly-shaped substrate 64 can be designed to have three lobes 66, 68, and 70. The number of deflection members 86 is generally equal to the number of lobes of the substrate 64. In this regard, the deflection members 86 are each designed to direct the exhaust flow that passes through dispersion member 62 toward each lobe 66, 68, and 70 of substrate 64. For example, a first deflection member 88 can be operable to deflect exhaust gases toward lobe 66; a second deflection member 90 can be operable to deflect exhaust gases toward lobe 68; and a third deflection member 92 can be operable to deflect exhaust gases toward lobe 70. By deflecting the exhaust gases in this manner, the entire surface of substrate 64 can more reliably be impinged upon by the mixture of exhaust treatment fluid and exhaust gases. It should be understood, however, that any number of deflection members 86 may be used without departing from the scope of the present disclosure so long as exhaust gases are more efficiently deflected over the entire surface of substrate 64.

As shown in FIG. 5 and as stated above, pipe 72 can be offset from a center or centroid 74 of substrate 64. Because dispersion device 62 is mounted within an off-set pipe 72, deflection member 90 may not be sufficient to alone deflect exhaust gases toward lobe 68. To further assist deflection member 90 in deflecting a sufficient amount of exhaust gases toward lobe 68, which is located furthest away from dispersion device 62, dispersion device 62 can also include a radially-inwardly-extending flange 94 disposed upstream from deflection members 86.

Radially-inwardly-extending flange 94 extends radially inward toward a longitudinal axis of dispersion device 62, and is formed at a position of cylindrical ring 80 that deflect the exhaust gases toward lobe 68, which is located furthest away from dispersion device 62. Although not required by the present disclosure, radially-inwardly-extending flange 94 can include a plurality of apertures or slots 96 that work in the same manner as cut-outs 84. That is, slots 96 will allow a portion of the exhaust gases to radially outwardly escape dispersion device 62 to reduce backpressure in exhaust system 10.

Figure 10:
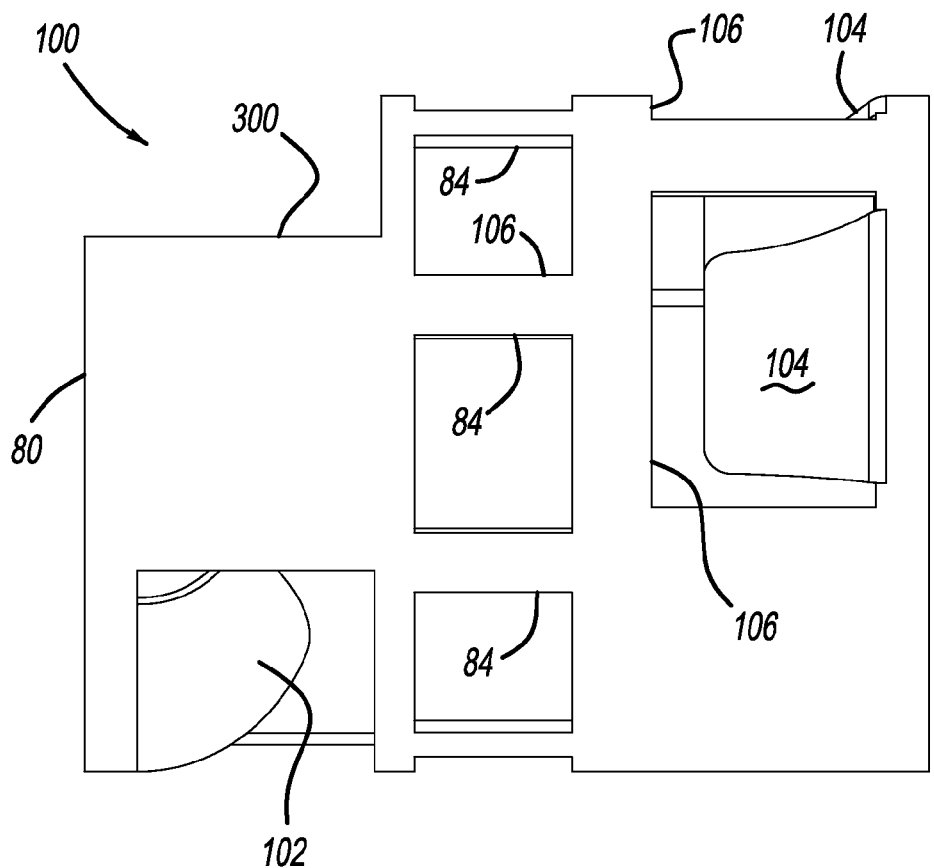
FIG. 10 illustrates another exemplary dispersion device in accordance with a principle of the present disclosure.
Figure 11:
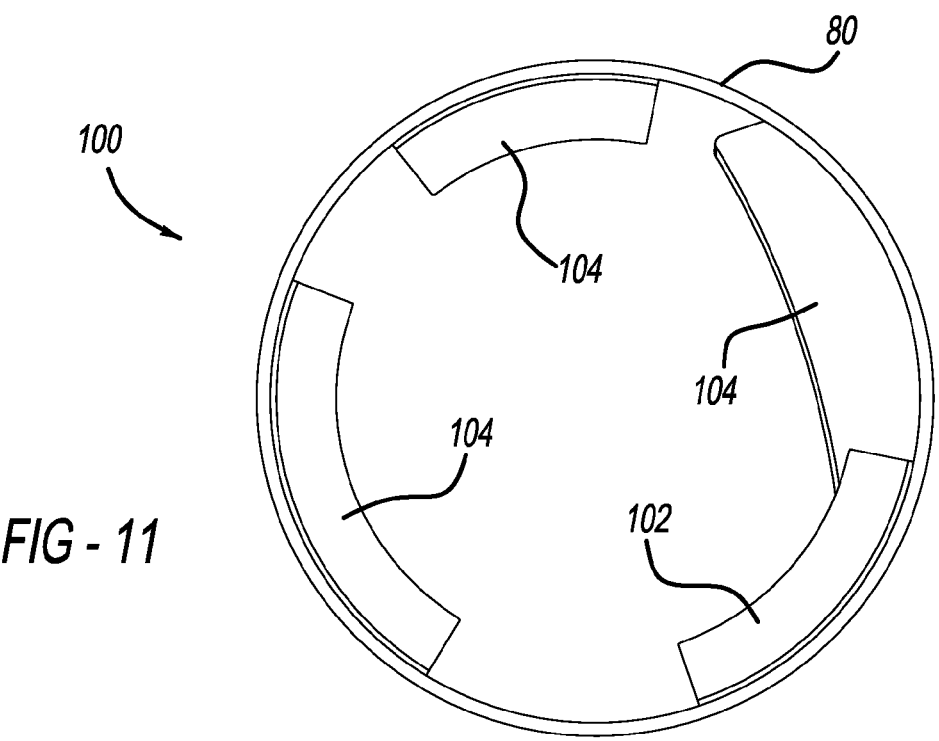
FIG. 11 illustrates an axial-perspective view of the dispersion device illustrated in FIG. 10.
Figure 12:
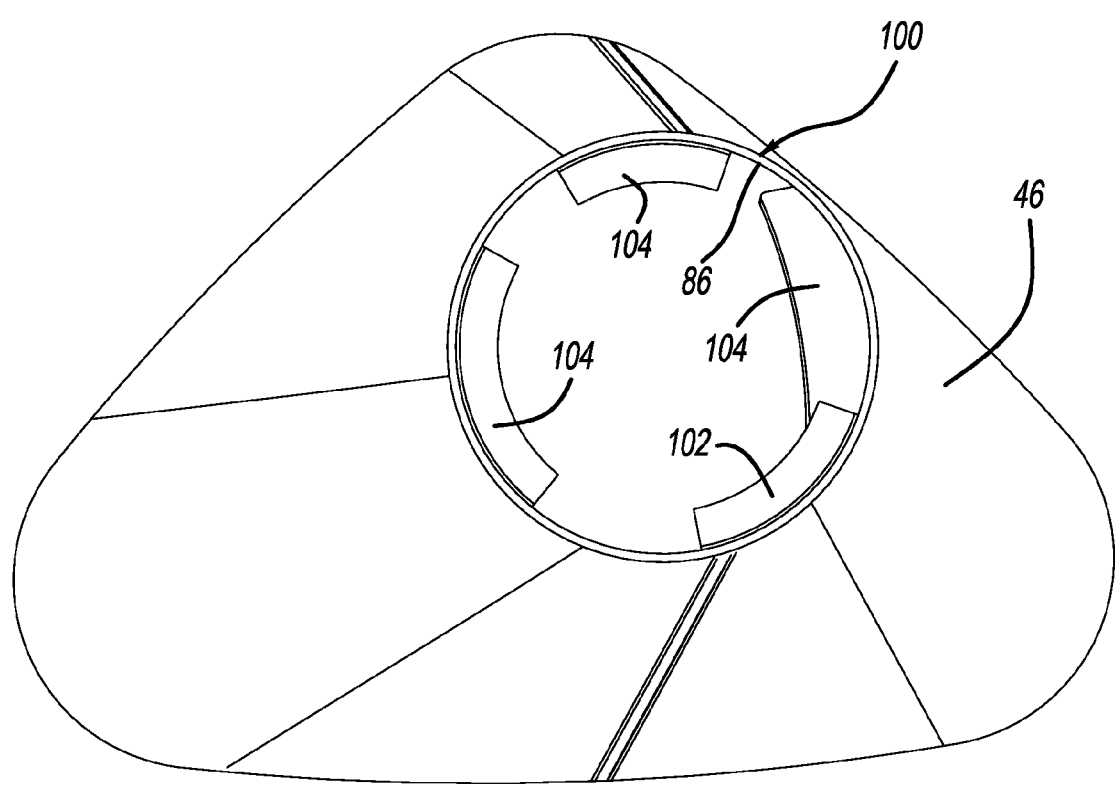
FIG. 12 illustrates an axial-perspective view of the dispersion device illustrated in FIG. 11 disposed in an exhaust line.
Figure 13:
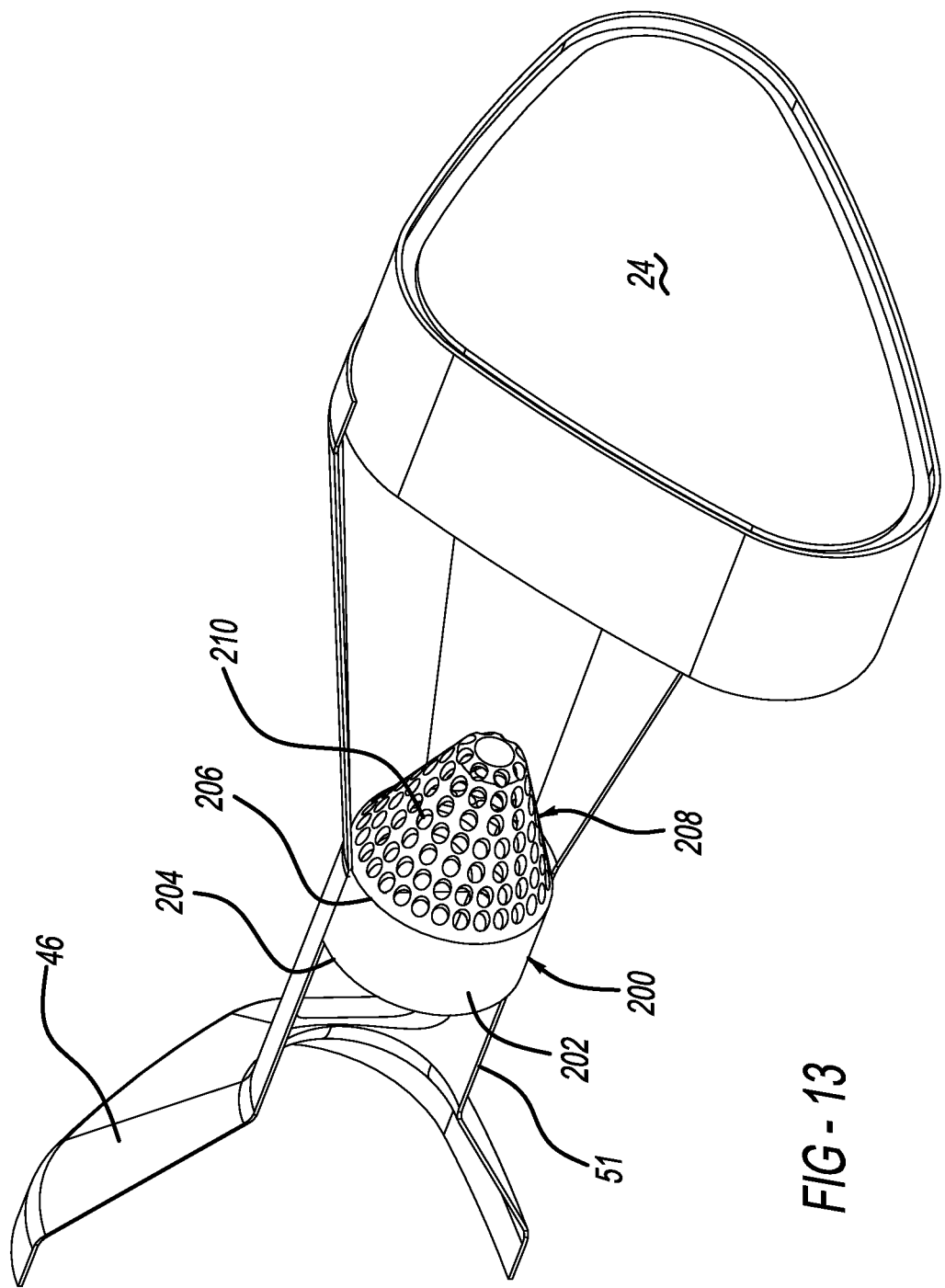
FIG. 13 illustrates a perspective view of another exemplary dispersion device in accordance with a principle of the present disclosure disposed in an exhaust line.
Figure 14:
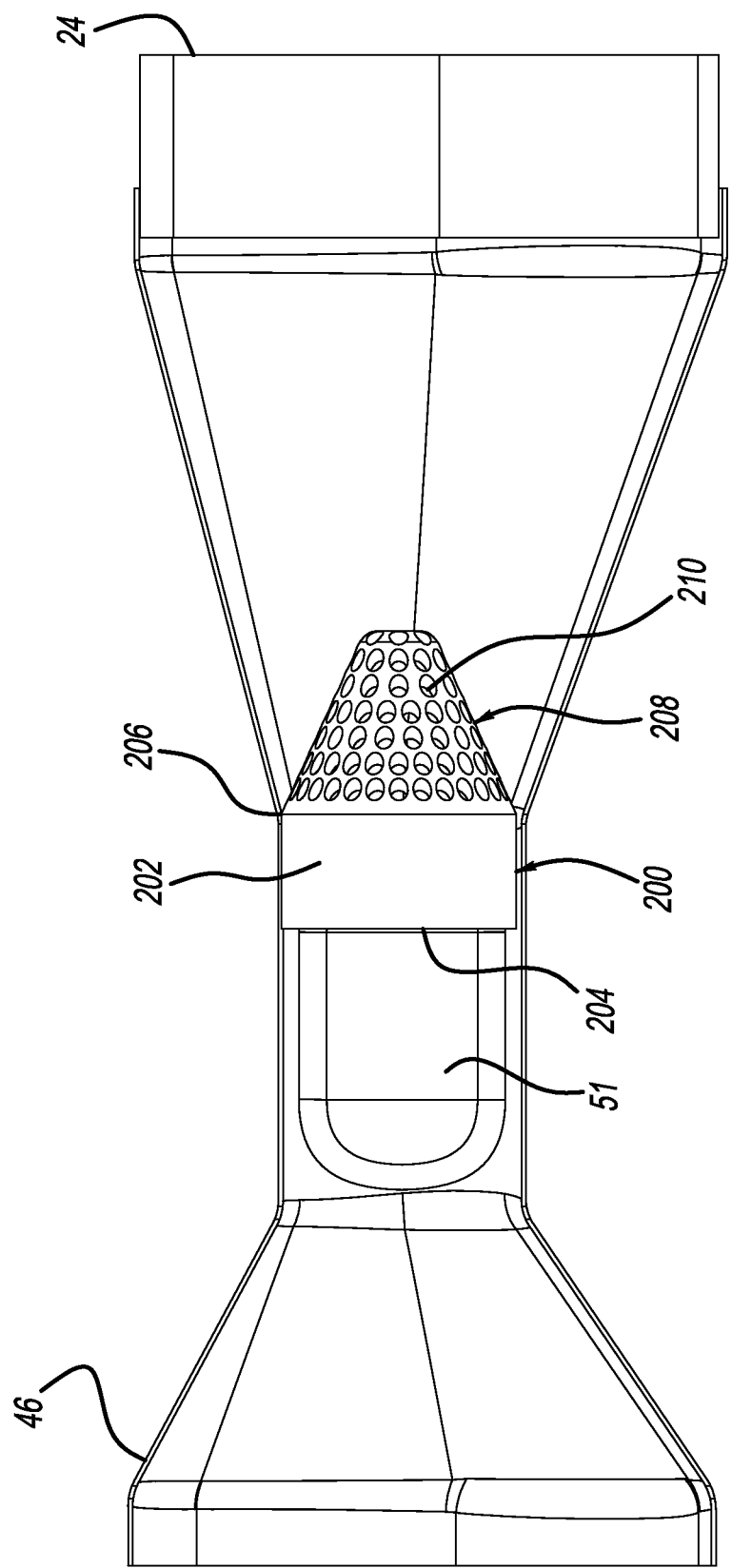
FIG. 14 illustrates a side-perspective view of the dispersion device disposed in the exhaust line shown in FIG. 13.
Figure 15:
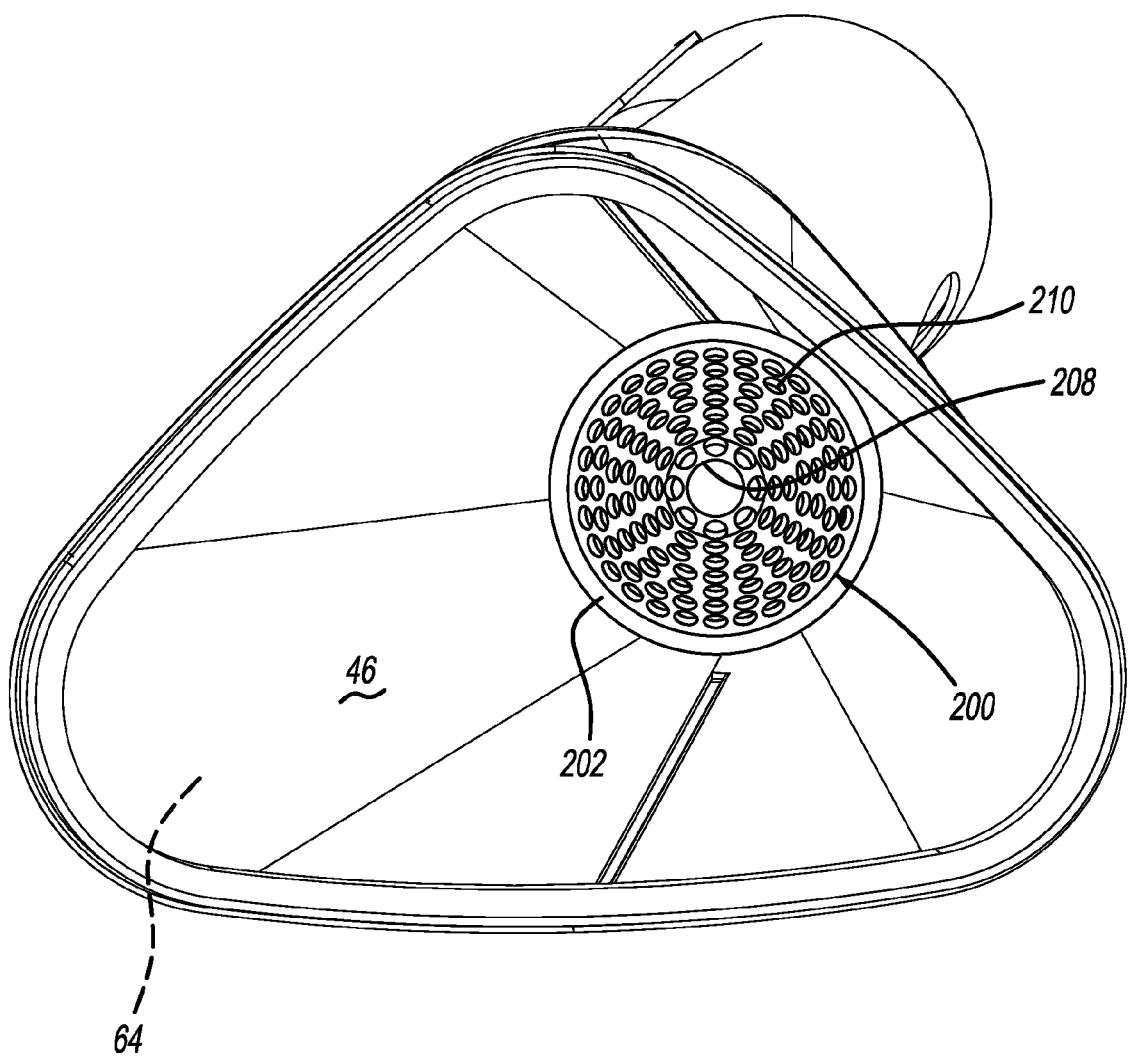
FIG. 15 is an axial-perspective view of the dispersion device disposed in the exhaust line shown in FIG. 14.
Figure 16:
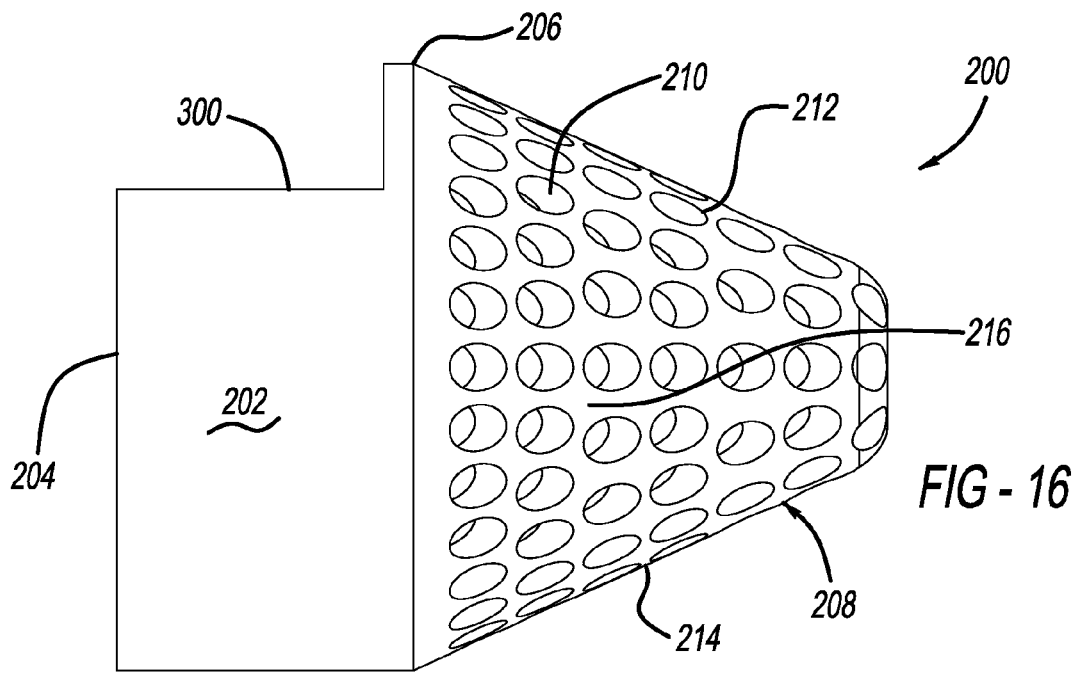
FIG. 16 is a side-perspective view of the dispersion device illustrated in FIG. 13.
Figure 17:
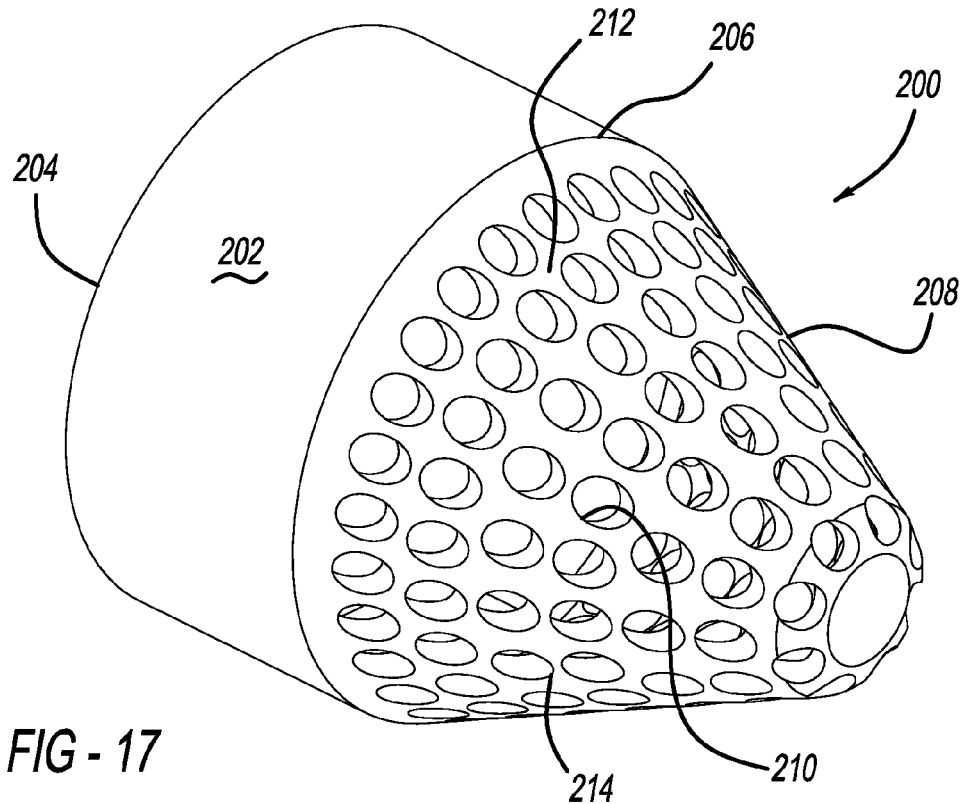
FIG. 17 is a perspective view of the dispersion device illustrated in FIG. 16.
Figure 18:
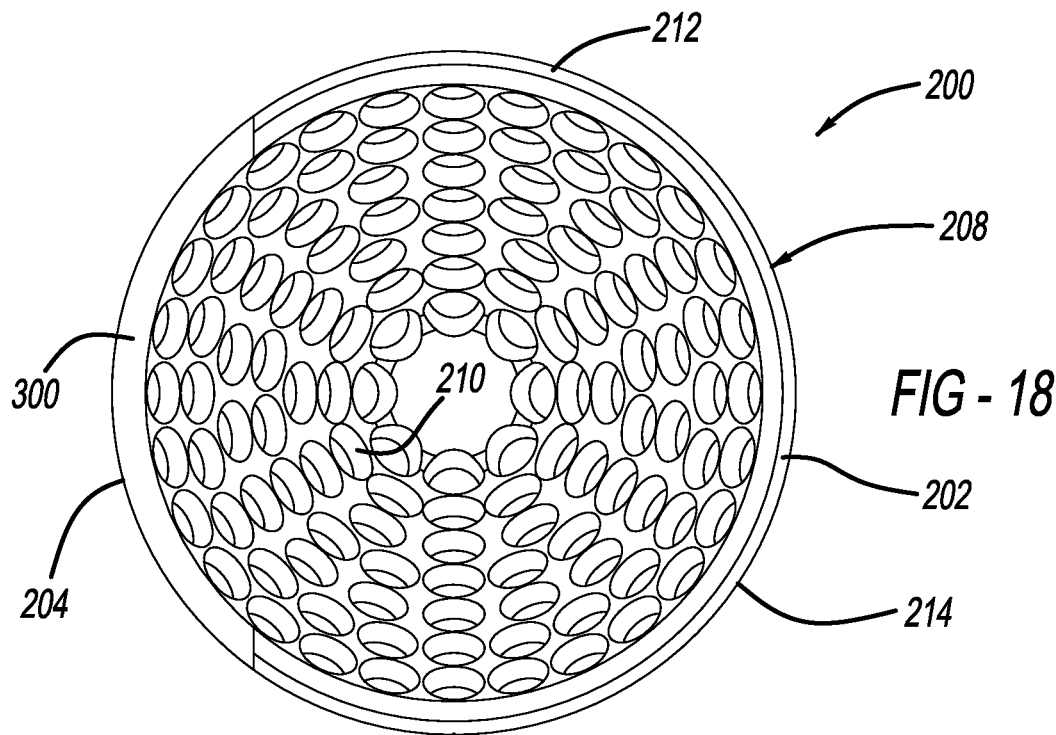
FIG. 18 is an axial-perspective view of the dispersion device illustrated in FIG. 17.
Figure 19A:
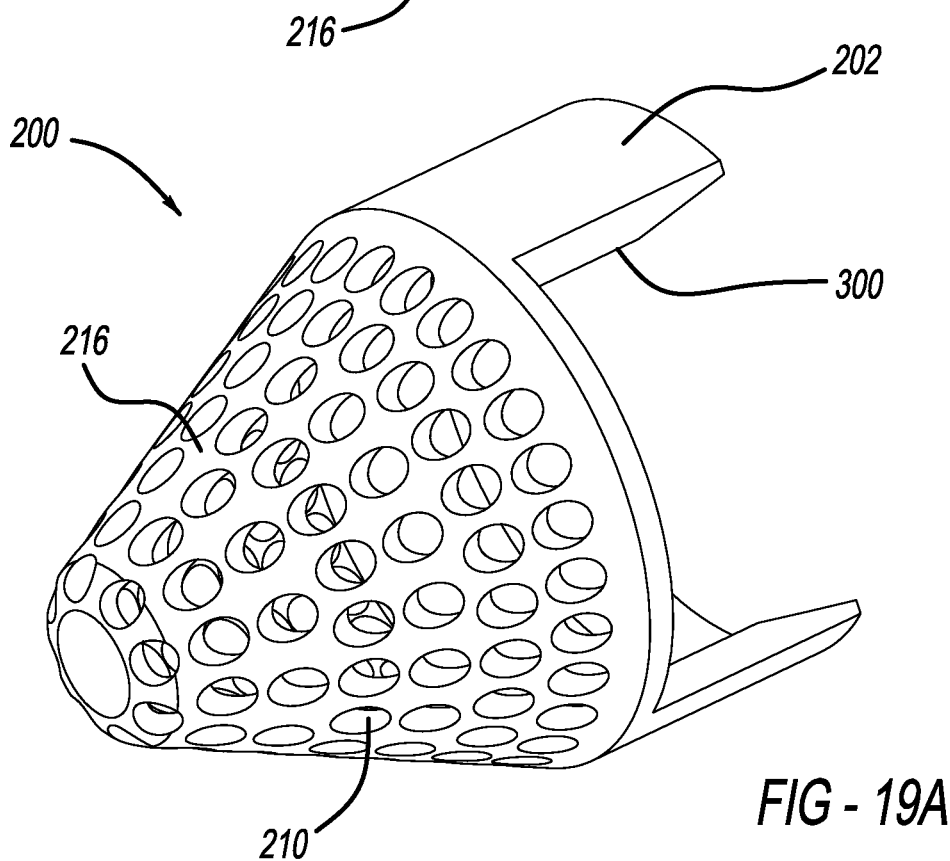
FIGS. 19A to 19E show various perspective views of the dispersion device illustrated in FIGS. 13-18.
Figure 19B:
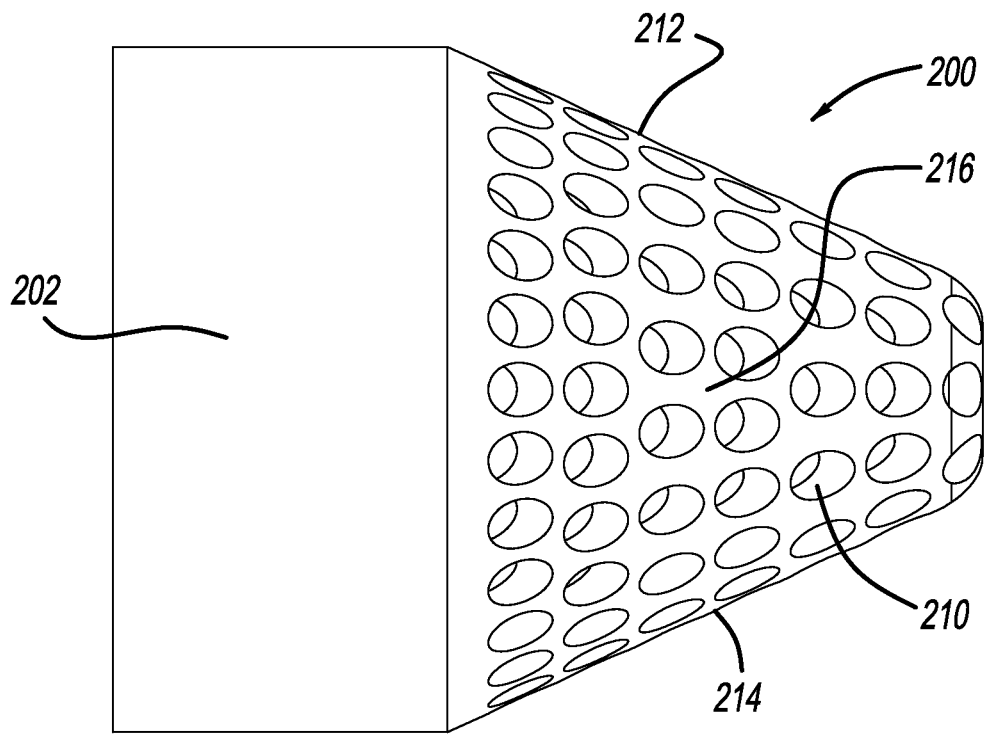
Figure 19C:
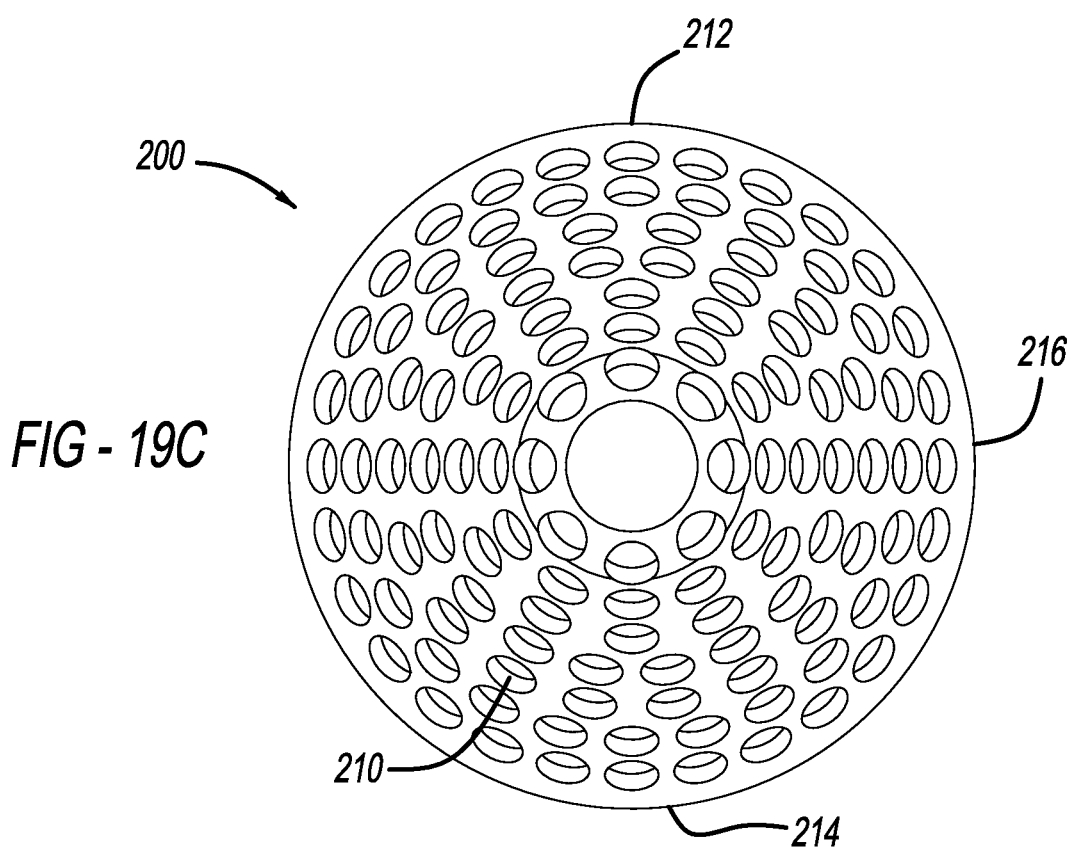
Figure 19D:
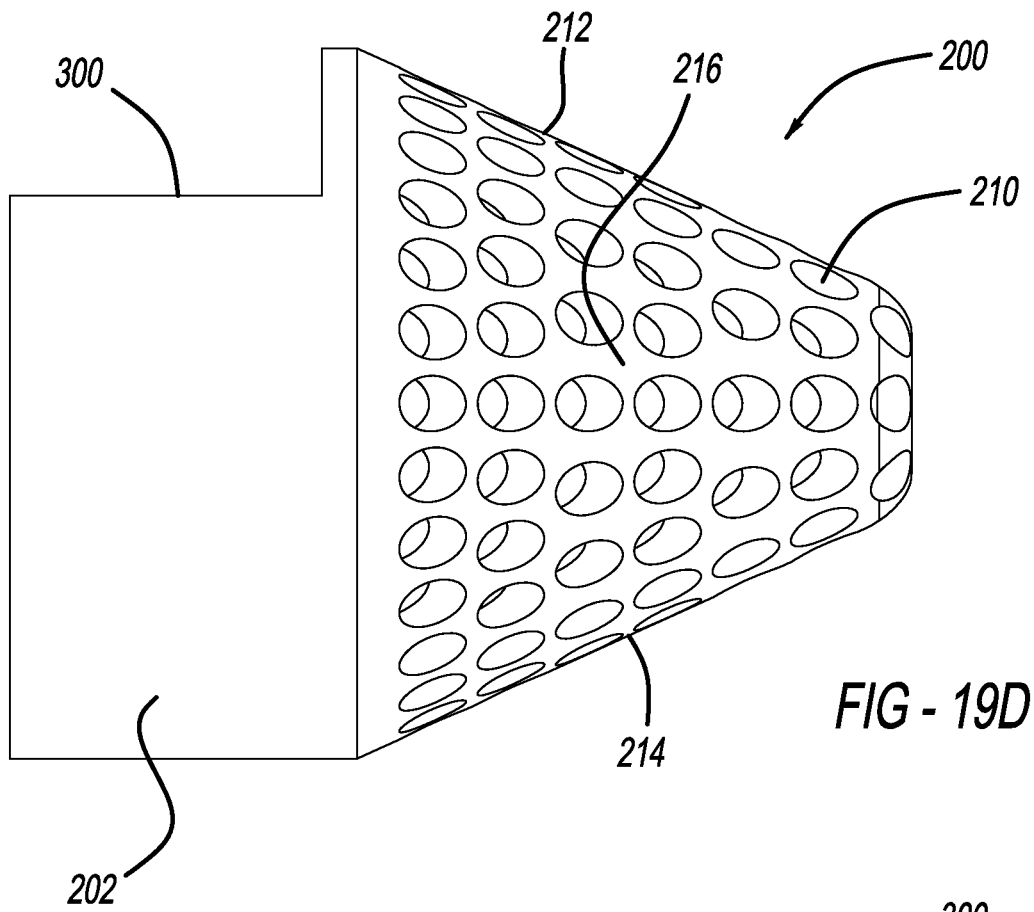
Figure 19E:
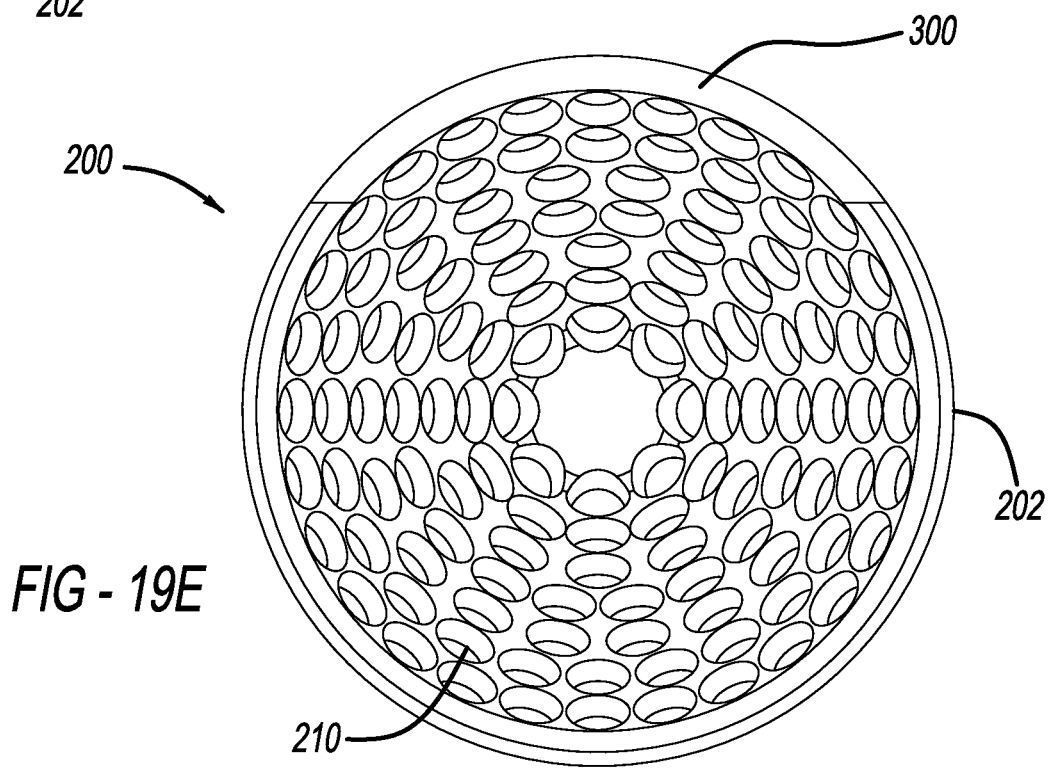

FIGS. 10-12 illustrate another dispersion device 100 in accordance with a principle of the present disclosure. Similar to dispersion device 62, dispersion device 100 includes a cylindrical ring 80 for welding dispersion device 100 to an inner surface 82 of outlet section 46. Downstream from cylindrical ring 80 is a radially-inwardly-extending flange 102. Radially-inwardly-extending flange 102 differs from radially-inwardly-extending flange 94 in that flange 102 does not include slots 96. Nonetheless, the function of radially-inwardly-extending flange 102 is the same as that of flange 94. That is, flange 102 is located a position of cylindrical ring 80 that will deflect the largest amount of exhaust gases toward the surface of substrate 64 that is locate furthest away from dispersion device 100. Specifically, using FIG. 2 as an example, flange 102 is positioned to deflect the exhaust gases toward lobe 68 of substrate 64.

Downstream from flange 102 can be disposed a plurality of cut-outs 84 that allow exhaust gases to radially escape from dispersion device 100 and reduce backpressure in exhaust system 10. Downstream from cut-outs 84 are disposed deflection members 104. In contrast to deflection members 86 of dispersion device 62 that extend radially outwardly from cylindrical ring 80, deflection members 104 extend radially inwardly in a manner similar to radially-inwardly-extending flange 102. As exhaust gases approach deflection members 104, the exhaust gases will be deflected radially outwardly through openings 106 that correspond to each of the deflection members 104. Each deflection member 104 may correspond to and direct exhaust flow toward a lobe 66, 68, and 70 of substrate 64.

To further assist with directing exhaust gases toward a respective lobe 66, 68, and 70, each deflection member 86 or 104 may be individually tuned. More particularly, for example, an amount that each deflection member 86 or 104 extends radially outwardly or inwardly may be adjusted to capture either a larger or lesser amount of exhaust flow. This may be advantageous to deflect a larger amount of low towards a lobe located the furthest away from the dispersion device 62 or 100, or may be advantageous to deflect a lesser amount of exhaust flow to a particular lobe. To deflect a larger amount of exhaust flow, the deflection members 86 or 104 can extend radially outwardly or inwardly to a greater extent that the other deflection members 86 or 104. Conversely, if a lesser amount of exhaust flow is desired, the deflection members 86 or 104 can extend radially outwardly or inwardly to a lesser extent that the other deflection members 86 or 104. Another alternative to further assist in intermingling of the exhaust treatment fluid and the engine exhaust as it passes through dispersion devices 62 and 100 is to slightly twist one or each of deflection members 86 or 104. That is, rather than simply orienting the deflection members 86 or 104 radially inward or radially outward from ring 80, at least one of the deflection members 86 or 104 can be slightly twisted to change an orientation of the deflection member 86 or 104.

Figure 8:
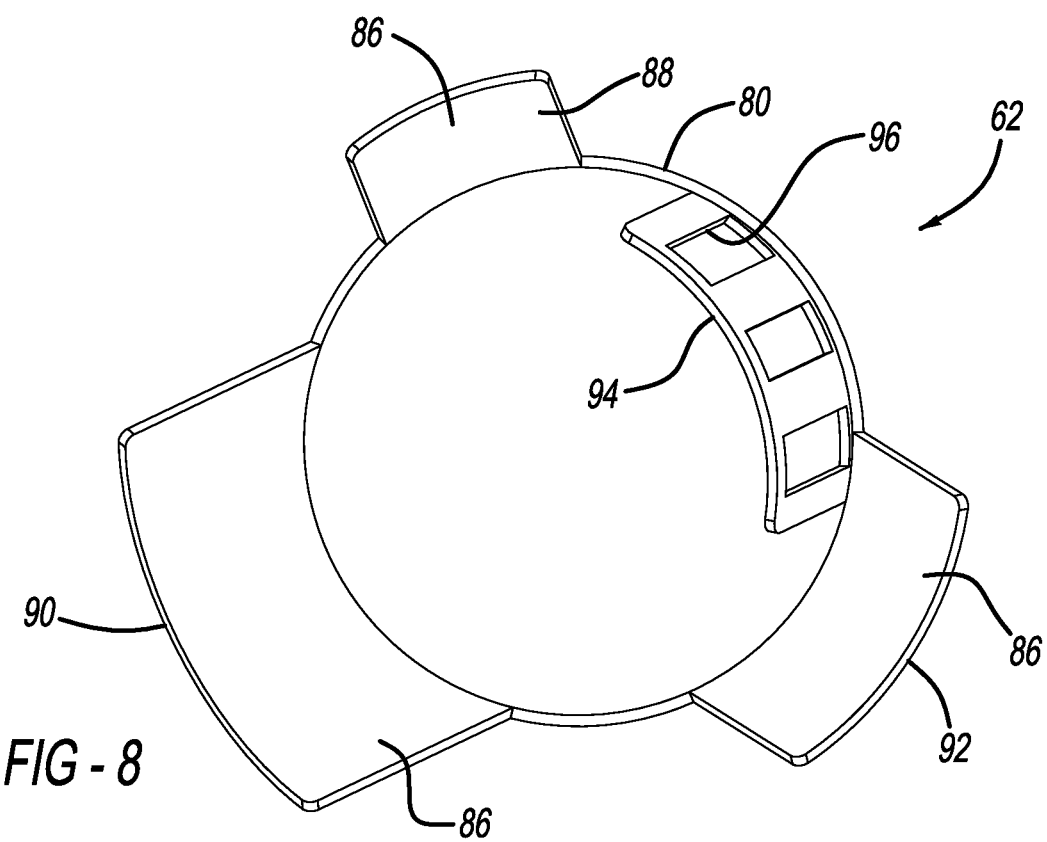
FIG. 8 is an axial-perspective view of the dispersion device illustrated in FIG. 7.
Figure 9A:
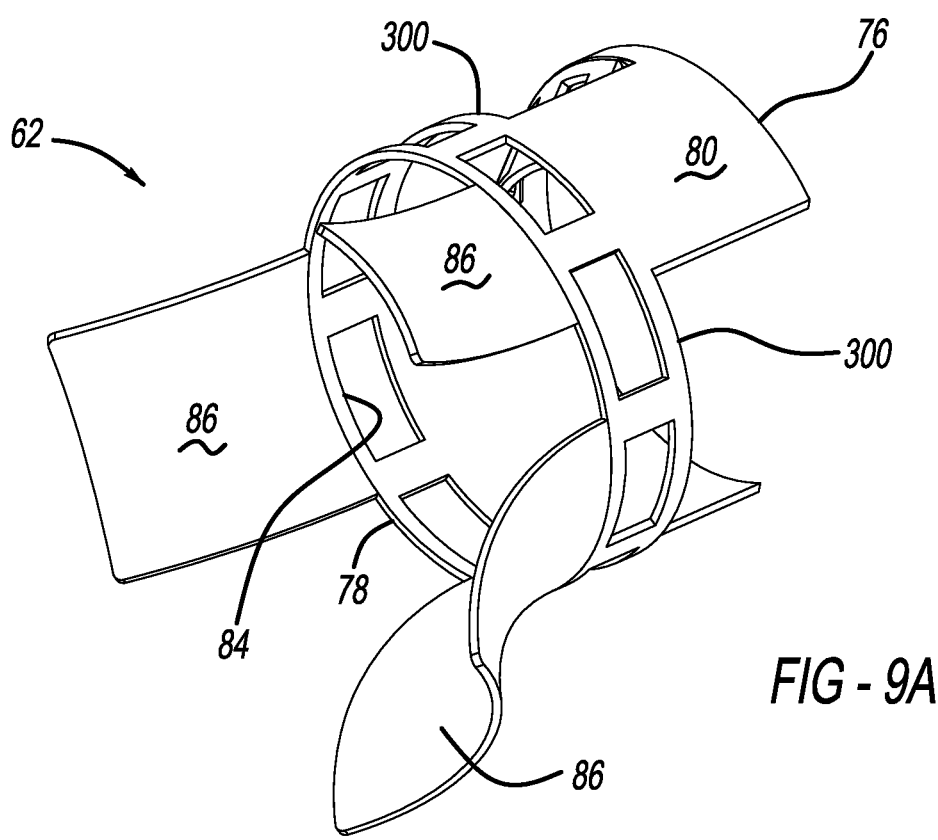
FIGS. 9A to 9E show various perspective views of the dispersion device illustrated in FIGS. 6 to 8.
Figure 9B:
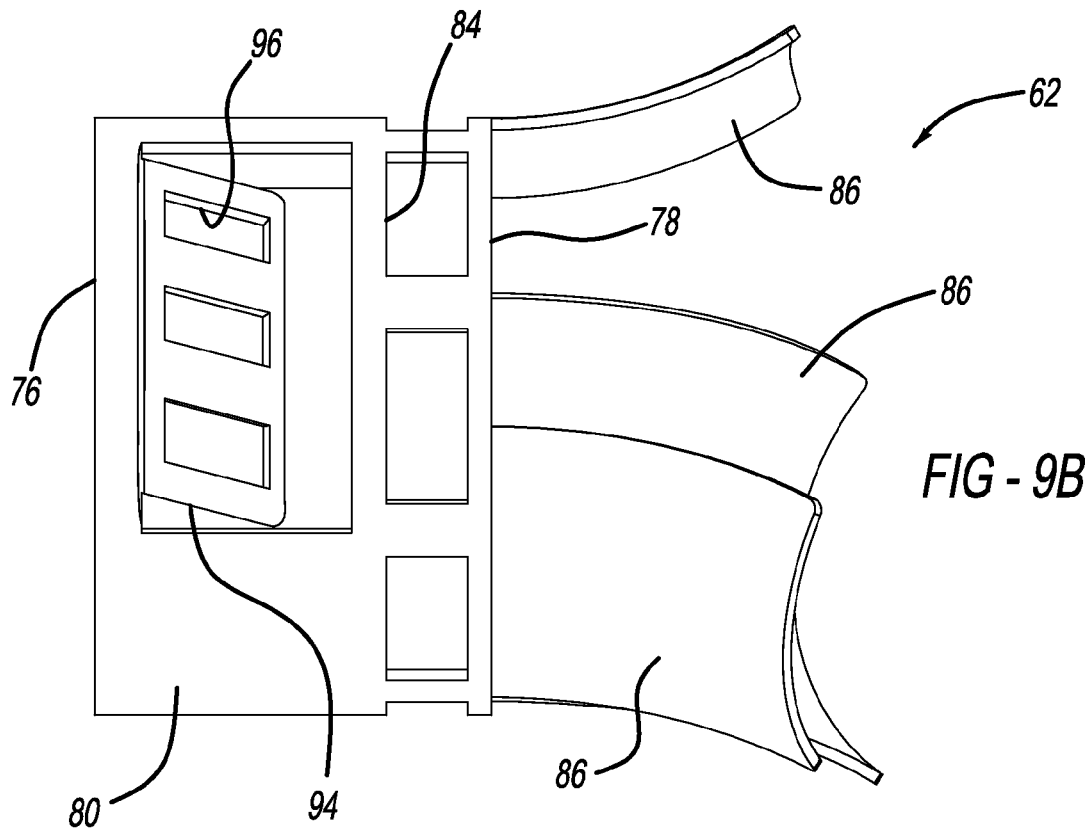
Figure 9C:
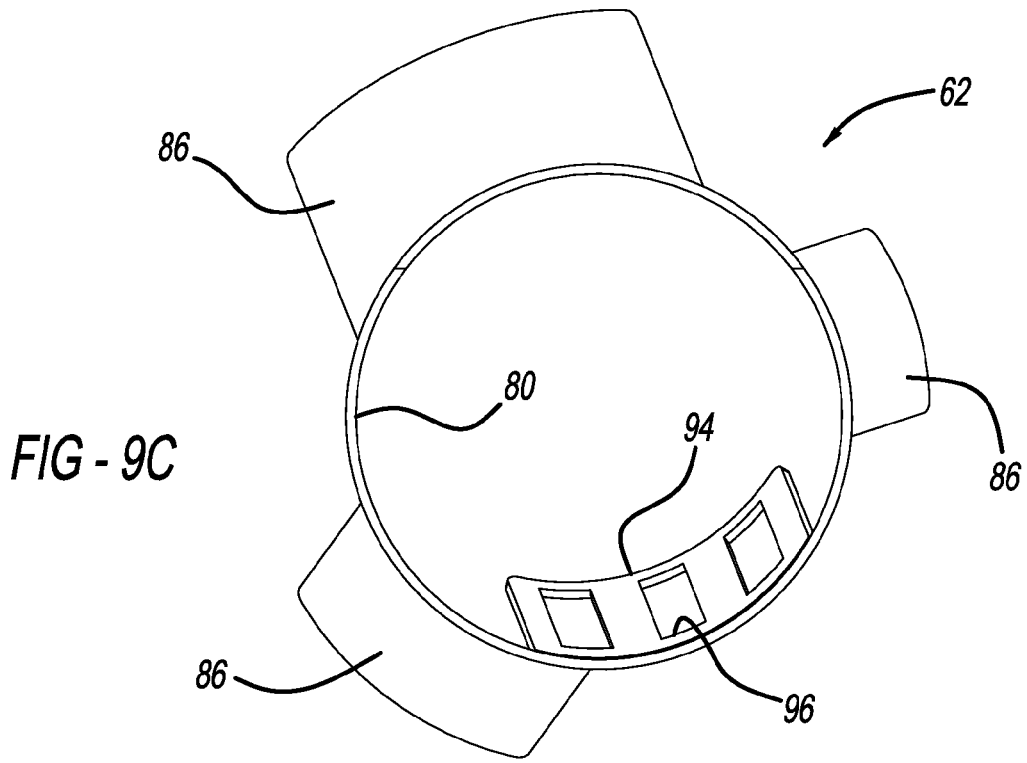
Figure 9D:
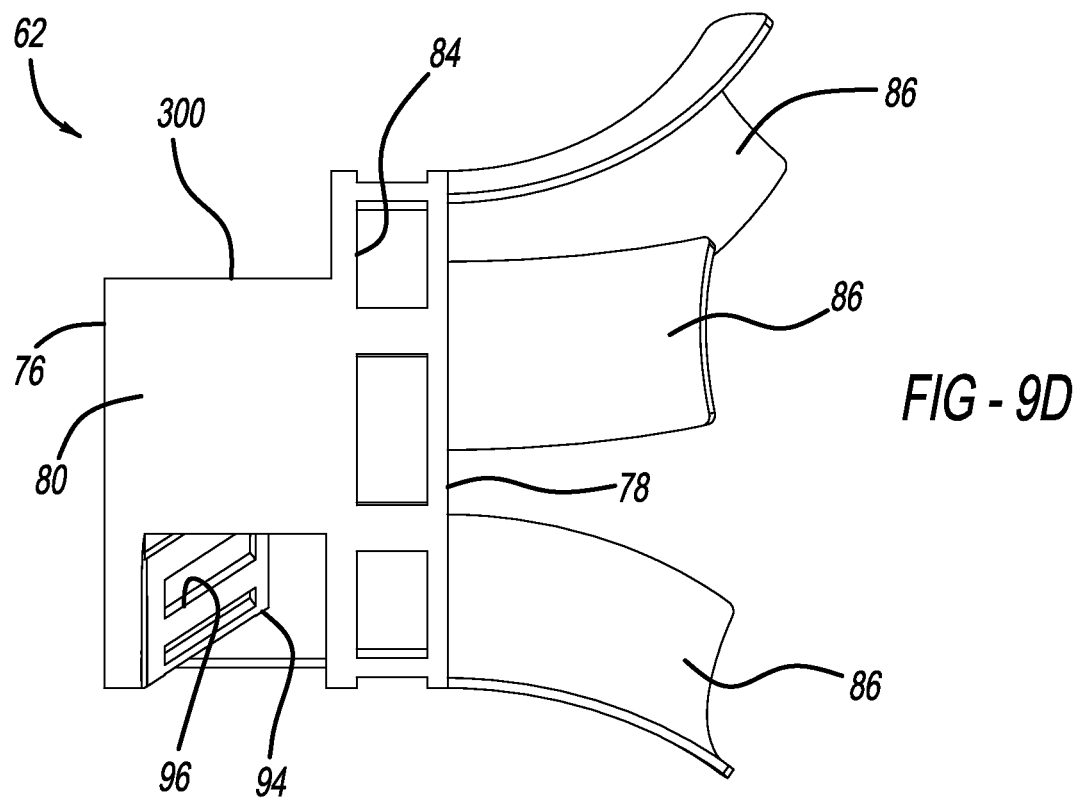
Figure 9E:
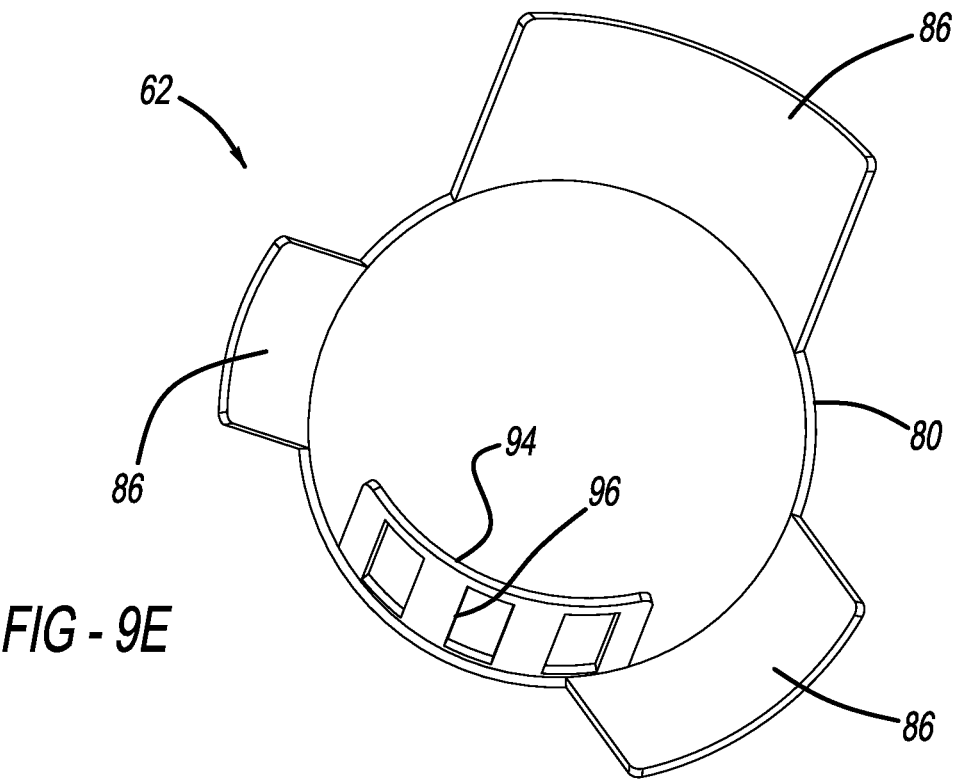

Another way to individually tune each deflection member 86 or 104 is to increase the surface area of each deflection member 86 or 104, as needed. For example, if a larger amount of exhaust flow is required to a particular location, the size of the deflection member 86 or 104 can be increased. Conversely, if a lower amount of exhaust flow is desired at particular location, the size of the deflection member 104 can be reduced. For example, as best shown in FIG. 8, it can be seen that the largest deflection member 86 is second deflection member 90. This is because deflection member 90 is responsible for deflecting exhaust gases toward lobe 68, which is located furthest away from dispersion device 62. Because lobes 66 and 70 do not require as much assistance as lobe 68 in having exhaust gases dispersed thereon, first and third deflection members 88 and 92 do not need to be as large as second deflection member 90.

Now referring to FIGS. 13-19, another exemplary dispersion device 200 is illustrated. Similar to dispersion devices 62 and 100, dispersion device 200 includes a cylindrical mounting ring 202 located at a first end 204 thereof. At a second end 206 is formed a cone-shaped deflection device 208. Deflection device 208 includes a plurality of perforations 210 that allow exhaust gases flowing through deflection device 208 to be radially dispersed outward from deflection device 208. By radially dispersing the exhaust gases radially outward from deflection device 208, the exhaust gases will more readily be impinged upon substantially the entire surface of substrate 64.

To further assist in directing the exhaust gases passing through deflection device 208, each perforation 210 can be oriented in a specific direction. For example, to assist in deflecting exhaust gases toward first lobe 66, each perforation 210 formed on an upper surface 212 can be oriented in the general direction where lobe 66 is located. Similarly, perforations 210 formed on lower side surface 214 of deflection device 208 can be oriented toward lobe 70, while perforations 210 formed on a side 216 of deflection device 208 that is opposite to lower side surface 214 can be oriented toward lobe 68. Regardless, it should be understood that each perforation 210 can be oriented in a specific direction where exhaust gas flow is desired to be directed.

In each of the above-described embodiments, it can be seen that outlet section 46 includes a depression 51 formed therein. Depression 51 is used to provide additional turbulence to the exhaust flow before the exhaust flow enters a respective dispersion device 62, 100, or 200. A length of depression 51 is variable, but any length sufficient for providing adequate turbulence to the exhaust stream may be used. To account for depression 51, each dispersion device 62, 100, and 200 can include an aperture 300 formed therein that allows each dispersion device 62, 100, and 200 to be mounted in a manner that overlaps the depression 51.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system, comprising:

an exhaust passage having a circular cross-section and a longitudinal axis;

an exhaust treatment component having an inlet surface with a noncircular cross-sectional shape and being in communication with the exhaust passage, wherein the inlet surface of the exhaust treatment component includes a portion positioned further from the longitudinal axis of the exhaust passage than all other portions of the inlet surface; and a dispersion device disposed in the exhaust passage at a position upstream of the exhaust treatment component, the dispersion device including a cylindrical mounting ring and a plurality of deflection members, each deflection member being operable to direct part of an exhaust stream flowing through the exhaust passage in a direction to evenly distribute the exhaust flow over the inlet surface of the exhaust treatment component.

2. The exhaust after-treatment system of claim 1, wherein the cylindrical mounting ring includes an upstream end and a downstream end and each of the deflection members extend axially downstream from the downstream end of the cylindrical mounting ring.

3. The exhaust after-treatment system of claim 1, wherein the deflection members extend radially outward relative to the cylindrical mounting ring are circumferentially spaced apart and each include a convex surface facing a longitudinal axis of the cylindrical mounting ring.

4. The exhaust after-treatment system of claim 1, wherein the deflection members extend radially inward relative to the cylindrical mounting ring.

5. The exhaust after-treatment system of claim 1, wherein the cylindrical mounting ring includes a plurality of first cut-outs positioned around a circumference thereof that allow a portion of the exhaust to escape the dispersion device before being directed by the deflection members.

6. The exhaust after-treatment system of claim 1, wherein the cylindrical mounting ring includes a radially-inwardly-extending flange positioned to direct the exhaust flow.

7. The exhaust after-treatment system of claim 1, further comprising an exhaust gas mixing assembly positioned within the exhaust passage at a location upstream of the dispersion device.

8. The exhaust after-treatment system of claim 7, wherein the exhaust passage includes an injector housing for mounting an exhaust treatment fluid injector, the injector housing being positioned upstream of the mixing assembly.

9. The exhaust after-treatment system of claim 1, wherein the exhaust treatment component is a selective catalytic reduction (SCR) substrate.

10. The exhaust after-treatment system of claim 1, wherein the exhaust treatment component is triangular, including a first lobe, a second lobe, and a third lobe; and the deflection members include a first deflection member for directing a portion of the exhaust flow toward the first lobe, a second deflection member for directing a portion of the exhaust flow toward the second lobe, and a third deflection member for directing a portion of the exhaust flow toward the third lobe.

11. The exhaust after-treatment system of claim 1, wherein each of the deflection members are individually tunable to assist in influencing directions of the exhaust flow.

12. An exhaust after-treatment system, comprising:

an exhaust passage;

an exhaust treatment component in communication with the exhaust passage; and a dispersion device disposed in the exhaust passage at a position upstream of the exhaust treatment device, the dispersion device including a cylindrical mounting ring and a plurality of dispersion members each being operable to direct an exhaust stream flowing through the dispersion device into a plurality of different directions to disperse the exhaust flow over substantially an entire surface of the exhaust treatment component, wherein the cylindrical mounting ring includes a radially-inwardly-extending flange including a plurality of second cut-outs formed therein.

13. An exhaust after-treatment system, comprising:
An exhaust passage;
An exhaust treatment component in communication with the exhaust passage; and
A dispersion device disposed in the exhaust passage at a position upstream of the exhaust treatment device, the dispersion device including a cylindrical mounting ring and a plurality of dispersion members each being operable to direct an exhaust stream flowing through the dispersion device into a plurality of different directions to disperse the exhaust flow over substantially an entire surface of the exhaust treatment component, wherein the exhaust passage includes a depression that radially narrows the exhaust passage, and the cylindrical mounting ring includes an aperture that overlaps the depression.

14. An exhaust after-treatment system for treating an exhaust produced by an engine, comprising:
an exhaust passage in communication with the engine;
an injector for dosing an exhaust treatment fluid into the exhaust passage;
a mixing device positioned downstream from the injector, the mixing device operable to intermingle the exhaust treatment fluid and the exhaust;
an exhaust treatment substrate positioned downstream from the mixing device; and
a dispersion device positioned between the mixing device and the exhaust treatment substrate, the dispersion device including a plurality of dispersion members each being operable to direct an exhaust stream flowing through the dispersion device into a plurality of different directions to disperse the exhaust flow over substantially an entire surface of the exhaust treatment substrate, wherein the dispersion device includes a cylindrical mounting ring, and each of the dispersion members extend from the cylindrical mounting ring, wherein the cylindrical mounting ring includes a radially-inwardly-extending flange, and further wherein the radially-inwardly-extending flange includes a plurality of second cut-outs formed therein.

15. An exhaust after-treatment system for treating an exhaust produced by an engine, comprising:
an exhaust passage in communication with the engine;
an injector for dosing an exhaust treatment fluid into the exhaust passage;
a mixing device positioned downstream from the injector, the mixing device operable to intermingle the exhaust treatment fluid and the exhaust;
an exhaust treatment substrate positioned downstream from the mixing device; and
a dispersion device positioned between the mixing device and the exhaust treatment substrate, the dispersion device including a plurality of dispersion members each being operable to direct an exhaust stream flowing through the dispersion device into a plurality of different directions to disperse the exhaust flow over substantially an entire surface of the exhaust treatment substrate, wherein the dispersion device includes a cylindrical mounting ring, and each of the dispersion members extend from the cylindrical mounting ring, and further wherein the exhaust passage includes a depression that radially narrows the exhaust passage, and the cylindrical mounting ring includes an aperture that overlaps the depression.

16. An exhaust after-treatment system, comprising:
an exhaust passage including a longitudinal axis;
an exhaust treatment component having an inlet surface with a noncircular cross-sectional shape and being in communication with the exhaust passage, the inlet surface having a centroid offset from the longitudinal axis; and
a dispersion device disposed in the exhaust passage and positioned upstream of the exhaust treatment device, the dispersion device including at least one deflection member operable to direct a portion of an exhaust stream flowing through the exhaust passage toward a portion of the inlet surface furthest from the longitudinal axis to evenly distribute the exhaust flow over the entire inlet surface.

17. The exhaust after-treatment system of claim 16, wherein the dispersion device includes a cylindrical mounting ring, and each of the deflection members extend from the cylindrical mounting ring.

18. The exhaust after-treatment system of claim 17, wherein the cylindrical mounting ring includes an upstream end and a downstream end and each of the deflection members extend axially downstream from the downstream end of the cylindrical mounting ring.

19. The exhaust after-treatment system of claim 17, wherein the deflection members extend radially outward relative to the cylindrical mounting ring are circumferentially spaced apart and each include a convex surface facing a longitudinal axis of the cylindrical mounting ring.

20. The exhaust after-treatment system of claim 17, wherein the deflection members extend radially inward relative to the cylindrical mounting ring.

21. The exhaust after-treatment system of claim 17, wherein the cylindrical mounting ring includes a plurality of first cut-outs positioned around a circumference thereof that allow a portion of the exhaust to escape the dispersion device before being directed by the deflection members.

22. The exhaust after-treatment system of claim 17, wherein the cylindrical mounting ring includes a radially-inwardly-extending flange positioned to direct the exhaust flow toward the portion of the inlet surface furthest from the longitudinal axis.

* * * * *